(12) United States Patent
Gray et al.

(10) Patent No.: US 12,531,142 B2
(45) Date of Patent: Jan. 20, 2026

(54) ALERT MANAGEMENT IN FLUID DELIVERY SYSTEM

(71) Applicant: Fresenius Kabi USA, LLC, Lake Zurich, IL (US)

(72) Inventors: George W. Gray, North Andover, MA (US); Jason M. Baldwin, Portsmouth, NH (US); Gabriel Stuparu, Westford, MA (US)

(73) Assignee: Fresenius Kabi USA, LLC, Lake Zurich, IL (US)

( * ) Notice: Subject to any disclaimer, the term of this patent is extended or adjusted under 35 U.S.C. 154(b) by 162 days.

(21) Appl. No.: 18/234,475

(22) Filed: Aug. 16, 2023

(65) Prior Publication Data

US 2024/0062866 A1    Feb. 22, 2024

Related U.S. Application Data

(60) Provisional application No. 63/398,766, filed on Aug. 17, 2022.

(51) Int. Cl.
  *G16H 20/17*    (2018.01)
  *A61M 5/172*    (2006.01)

(52) U.S. Cl.
  CPC ............ *G16H 20/17* (2018.01); *A61M 5/172* (2013.01)

(58) Field of Classification Search
  CPC ............................... G16H 20/17; A61M 5/172
  See application file for complete search history.

(56) References Cited

U.S. PATENT DOCUMENTS

| | | | |
|---|---|---|---|
| 9,940,441 B2* | 4/2018 | Walsh | G16H 20/17 |
| 10,346,591 B2* | 7/2019 | Gray | G16H 40/20 |
| 2012/0310204 A1* | 12/2012 | Krogh | A61M 5/16831 340/603 |
| 2015/0343141 A1* | 12/2015 | Lindo | A61M 5/16827 604/67 |
| 2016/0174911 A1* | 6/2016 | Palerm | A61B 5/14532 600/365 |

(Continued)

FOREIGN PATENT DOCUMENTS

| | | |
|---|---|---|
| WO | 2014100736 A2 | 6/2014 |
| WO | 2015184366 A1 | 12/2015 |

OTHER PUBLICATIONS

International Search Report and the Written Opinion of the International Searching Authority, PCT/US2023/030314, Nov. 7, 2023, pp. 1-17.

*Primary Examiner* — Mohamed Barakat
(74) *Attorney, Agent, or Firm* — Armis IP Law, LLC

(57) ABSTRACT

A fluid delivery system displays, on a display screen, fluid identifiers including a first fluid identifier indicating a first fluid and a second fluid identifier specifying a second fluid. The fluid delivery system further displays, on the display screen, a first indication of receiving an excessive number of fluid delivery pump programming alerts associated with the first fluid identifier. The fluid delivery system adjusts a first fluid delivery limit setting associated with delivery of the first fluid in response to the excessive number of fluid delivery pump programming alerts associated with the first fluid identifier. The fluid delivery system implements the adjusted first fluid delivery limit setting for each of multiple fluid delivery pumps subsequently requesting to deliver the first fluid to a respective recipient.

21 Claims, 17 Drawing Sheets

(56) References Cited

U.S. PATENT DOCUMENTS

2017/0319780 A1* 11/2017 Belkin .................... G16H 20/17
2020/0113515 A1*  4/2020 O'Connor .......... A61B 5/02055
2021/0358589 A1* 11/2021 Mooney ................. G16H 20/17

* cited by examiner

FIG. 2

| OVERRIDE | A START OF INFUSING WITH DRUG PARAMETERS OUTSIDE OF DEFINED LIMITS. |
|---|---|

—————————————— UPPER HARD LIMIT
42 — CONFIRM PARAMETERS → LIMIT ALERT → CONFIRM
—————————————— UPPER SOFT LIMIT   PARAMETERS
40      44                                               ↓
   SELECT DRUG                                      START
                                                    INFUSION
SELECT DRUG
—————————————— LOWER SOFT LIMIT
46  CONFIRM PARAMETERS → LIMIT ALERT → CONFIRM
—————————————— LOWER HARD LIMIT   PARAMETERS
                                                    ↓
                                              START INFUSION

| REPROGRAM | CONFIRM THE DRUG PARAMETERS OUTSIDE OF DEFINED LIMITS. AFTER AN OVERRIDE ALERT IS DISPLAYED, RETURN DRUG PARAMETERS TO BE WITHIN THE DEFINED LIMITS THEN STARTING AN INFUSION. |
|---|---|

—————————————— UPPER HARD LIMIT
52 — CONFIRM PARAMETERS → LIMIT ALERT
—————————————— UPPER SOFT LIMIT
54   START INFUSION
        SELECT DRUG
50                 START INFUSION
SELECT DRUG
—————————————— LOWER SOFT LIMIT
           CONFIRM PARAMETERS → LIMIT ALERT
—————————————— LOWER HARD LIMIT

| DRUG LIMIT | DRUG LIMIT: SERVER STORES FOUR TYPES OF LIMITS FOR EACH DRUG: UPPER HARD LIMIT, UPPER SOFT LIMIT, LOWER HARD LIMIT, AND LOWER SOFT LIMIT. |
|---|---|
| DATASET | A RULE SET THAT DEFINES UPPER / LOWER SOFT / HARD LIMITS FOR KNOWN DRUG TO BE INFUSED |

REPORTS INFUSION RECORD

| Date/Time | Event | Details |
|---|---|---|
| 10/29/2015 5:12PM | USER PAUSE | |
| 10/29/2015 5:12PM | PRIMARY INFUSION STOP | DOSE RATE = 2MCG / MIN<br>DOSE INFUSED = 0MG<br>CALCULATED DURATION = 0 SECONDS |
| 10/29/2015 5:12PM | PRIMARY INFUSION: CROSS BELOW LOWER SOFT LIMIT (LSL) — 61 | VOLUME INFUSED = 2.589ML<br>FLOW RATE = 720 ML / H<br>DOSE RATE = 2 MCG / MIN<br>DOSE INFUSED = 0 MG<br>ACTUAL DURATION = 14 SECONDS |
| 10/29/2015 5:12PM | PRIMARY INFUSION: OVERRIDE BELOW LOWER SOFT LIMIT (LSL) START — 60 | LIMIT VALUE = 1MCG / MIN |
| 10/29/2015 5:12PM | PRIMARY INFUSION: CONFIRMED VALUE OUTSIDE SOFT LIMITS — 62 | CONFIRMED VALUE = 0.01 MCG / MIN |
| 10/29/2015 5:12PM | PRIMARY INFUSION START — 64 | LIMIT 1.000 MCG / MIN |
| 10/29/2015 5:15PM | PRIMARY INFUSION: OVERRIDE BELOW LOWER SOFT LIMIT (LSL) END | FLOW RATE = 3.6 ML<br>VOLUME TO INFUSE = 2.597ML<br>DOSE RATE = 0.01 MCG / MIN<br>DOSE INFUSED = 0 MG<br>CALCULATED DURATION = 2597 SECONDS |
| 10/29/2015 5:15PM | PRIMARY INFUSION STOP | CONFIRMED VALUE = 0.01 MCG / MIN<br>LIMIT VALUE = 1.000 MCG / MIN |
| 10/29/2015 5:15PM | USER INITIATED END OF PRIMARY INFUSION | ACTUAL DURATION = 198 SECONDS |
| 10/29/2015 5:15PM | END OF INFUSION | |

FIG. 3

| | | |
|---|---|---|
| 11/17/2015 8:04PM | USER PAUSE | |
| 11/17/2015 8:04PM | PRIMARY INFUSION STOP | VOLUME INFUSED = 0.309ML<br>FLOW RATE = 12ML/H<br>DOSE RATE = 2 MCG/MIN<br>DOSE INFUSED = 0.003MG<br>ACTUAL DURATION = 92 SECONDS |
| 11/17/2015 8:04PM | PRIMARY INFUSION: CROSS ABOVE UPPER SOFT LIMIT (USL) | LIMIT VALUE = 4 MCG/MIN |
| 11/17/2015 8:04PM | PRIMARY INFUSION: REPROGRAM ABOVE UPPER SOFT LIMIT (USL) | LIMIT VALUE = 4 MCG/MIN |
| 11/17/2015 8:04PM | PRIMARY INFUSION: CONFIRMED VALUE OUTSIDE SOFT LIMITS | LIMIT VALUE = 4 MCG/MIN |
| 11/17/2015 8:05PM | PRIMARY INFUSION: CROSS ABOVE UPPER SOFT LIMIT (USL) | LIMIT VALUE = 4 MCG/MIN |
| 11/17/2015 8:05PM | PRIMARY INFUSION: CROSS BELOW UPPER SOFT LIMIT (USL) | LIMIT VALUE = 4 MCG/MIN |
| 11/17/2015 8:05PM | PRIMARY INFUSION START | FLOW RATE = 23.4ML/H<br>VOLUME INFUSED = 0.31ML<br>VOLUME TO INFUSE = 499.69<br>DOSE RATE = 3.9 MCG/MIN<br>DOSE INFUSED = 0.003 MG<br>CALCULATED DURATION = 76875 SECONDS |
| 11/17/2015 8:05PM | USER PAUSE | |

FIG. 4

REPORTS > OVERRIDE LISTING

| REPORT TYPE : OVERRIDE LISTING ⌄ | | FROM : 30 DAYS ☐ | TO : TODAY ☐ | | | EXPORT |
|---|---|---|---|---|---|---|
| HOSPITAL : ALL ⌄ | VIGILANT DATA SET : ALL ⌄ | | PROFILE : ALL ⌄ | | | |
| DEVICE TYPE : ALL ⌄ | INFUSION MODE : ALL ⌄ | | DRUG : ALL ⌄ | | | |

63790 TOTAL OVERRIDES

| START TIME | END TIME | HOSPITAL | DATA SET | PROFILE | DRUG | OVERRIDE |
|---|---|---|---|---|---|---|
| 6/15 2015 2:45 PM | 6/15 2015 2:27 PM | ROYAL INFIRMARY | DATASET 12 | PEDS 19KG OR BELOW | DOPAMINE | LOADING DOSE: OVERRIDE BELOW LOWER SOFT LIMIT (LSL) |
| 6/15 2015 2:45 PM | 6/15 2015 2:34 PM | FIFE | DATASET 12 | PEDS 19KG OR BELOW | DOPAMINE | LOADING DOSE: OVERRIDE BELOW LOWER SOFT LIMIT (LSL) |
| 6/15 2015 2:45 PM | 6/15 2015 2:34 PM | FORTH VALLEY | DATASET 12 | PEDS 19KG OR BELOW | DOPAMINE | LOADING DOSE: OVERRIDE BELOW LOWER SOFT LIMIT (LSL) |
| 6/15 2015 2:45 PM | 6/15 2015 2:37 PM | ROYAL INFIRMARY | DATASET 12 | PEDS 19KG OR BELOW | DOPAMINE | LOADING DOSE: OVERRIDE BELOW LOWER SOFT LIMIT (LSL) |
| 6/15 2015 2:45 PM | 6/15 2015 2:46 PM | ROYAL INFIRMARY | DATASET 12 | PEDS 19KG OR BELOW | DOPAMINE | LOADING DOSE: OVERRIDE BELOW LOWER SOFT LIMIT (LSL) |

FIG. 5

ALERT MANAGEMENT IN FLUID DELIVERY SYSTEM

RELATED APPLICATION

This application claims the benefit of earlier filed U.S. Provisional Patent Application Ser. No. 63/398,766 entitled "EXCESSIVE ALERTS IN MEDICAL INFUSION SYSTEM," filed on Aug. 17, 2022, the entire teachings of which are incorporated herein by this reference.

BACKGROUND

Fluid delivery pumps are used to administer fluids to recipients. An infusion pump typically provides a controlled amount of the fluid to a recipient over time. The amount of fluid may be administered pursuant to parameters entered by a fluid delivery device operator.

To avoid errors in fluid administration, some infusion pumps store a library of fluids, programming parameters, and associated limits. For example, a fluid may have a hard upper limit for a parameter such as rate of delivery. The hard upper limit may be predetermined by a fluid control specialist. When a user selects the fluid and programs a rate of infusion on a respective fluid delivery pump, the fluid pump prevents the pump from being programmed to administer the drug above the hard upper limit. In another example, a fluid type may have a soft upper limit. When a user selects the fluid and attempts to program the rate of fluid delivery above the soft upper limit, an alert is displayed on the user interface to notify the user they are requesting a parameter value beyond the soft upper limit and asking the user to confirm the rate of delivery.

The fluid library may be created and updated by administrators. In some cases, those operators who use the pump have knowledge of appropriate fluid parameter limits in certain delivery areas that the fluid delivery device operator may not be aware of. This leads to frequent overriding or reprograming of limits programmed into the fluid library. In other words, not all clinicians using a respective fluid delivery pump to deliver fluid to a recipient understand the limits that have been selected for a particular fluid, while, for others it may be obvious. The result is that some fluid pump operators may attempt to override fluid delivery limits and may require additional training about fluid delivery. This effects efficiency of delivering fluid via hard and soft limits.

BRIEF DESCRIPTION OF THE DRAWINGS

FIG. 2 is an illustration of exemplary hard and soft limits and their overrides or reprogramming associated with fluid delivery;

FIG. 3 is a display screen of infusion records showing illustrative override events;

FIG. 4 is a display screen of infusion records showing illustrative reprogram events;

FIG. 5 is a display screen of an override listing report, according to an illustrative example;

DETAILED DESCRIPTION OF ILLUSTRATIVE EXAMPLES

Figure 1:
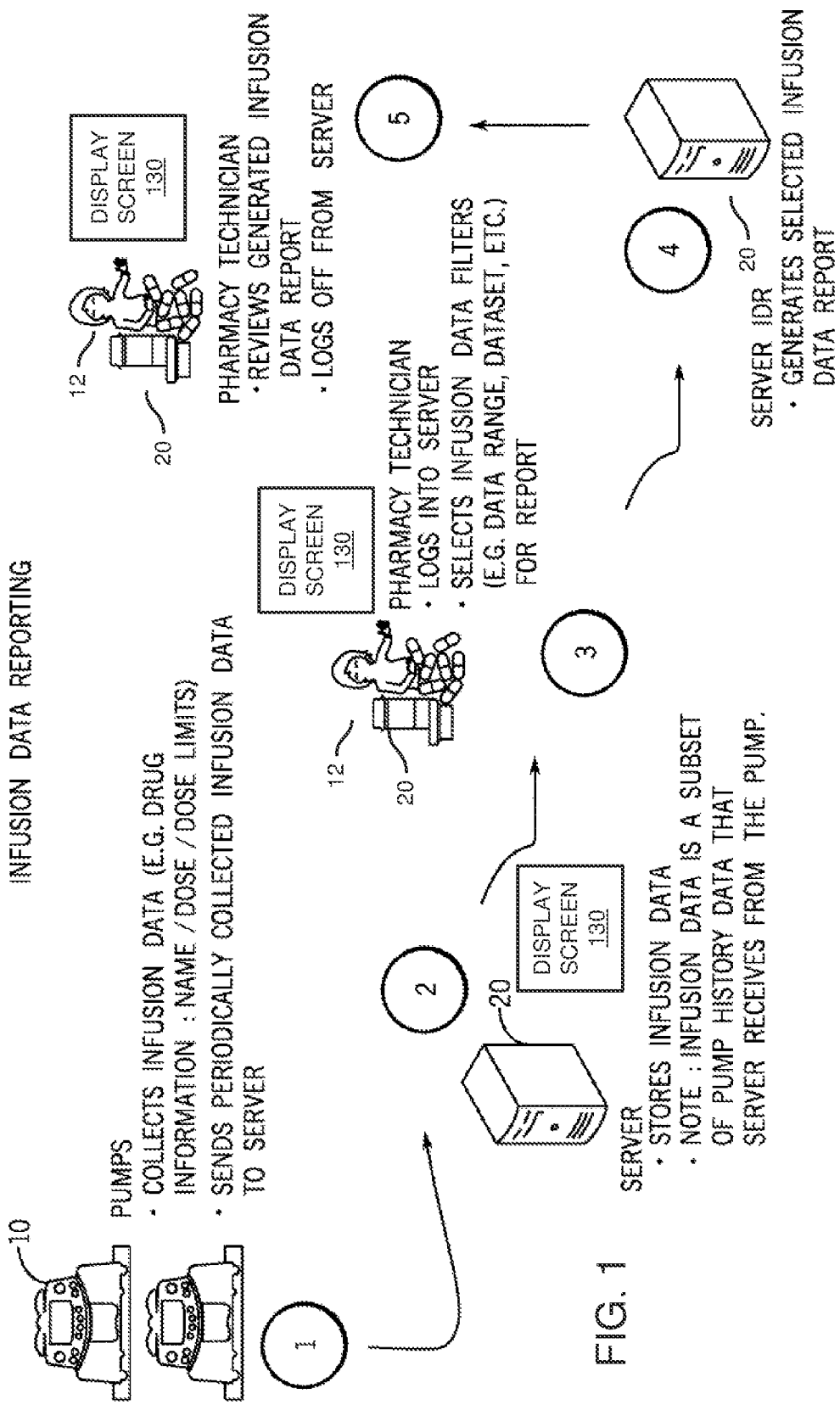
FIG. 1 is a flow diagram of a system for collecting fluid delivery data from a plurality of fluid delivery at a server computer, according to an illustrative example.

Some examples described herein may facilitate analysis of infusion events to help pharmacy and nursing staff to better communicate override and reprogram events.

Some examples described herein may identify issues with drug limits within a Dose Error Reduction System (DERS).

Some examples described herein may provide automated analysis instead of requiring a pharmacy to analyze data by hand.

Some examples described herein may help evaluate if drug limits defined for a drug should be adjusted in a DERS.

Some examples described herein may help with deciding if the current clinical procedure should be changed.

Some examples may help reduce infusion pump programming alerts from an infusion pump.

Some examples may improve delivery of an infusate to a person from an infusion pump.

Some examples may improve visibility of infusates having excessive alerts so that action can be taken by a pharmacist or other clinician.

Some examples may allow customized definitions for excessive alerts.

One example method as discussed herein includes a method comprising: on a display screen: i) displaying fluid identifiers including a first fluid identifier indicating a first fluid and a second fluid identifier specifying a second fluid, and ii) displaying a first indication of receiving an excessive number of fluid delivery pump programming alerts associated with the first fluid identifier; adjusting a first fluid delivery limit setting associated with delivery of the first fluid in response to the excessive number of fluid delivery pump programming alerts associated with the first fluid identifier; and implementing the adjusted first fluid delivery limit setting associated with the first fluid for each of multiple fluid delivery pumps requesting to deliver the first fluid to a respective recipient.

Each of the fluid delivery pump programming alerts can be configured to indicate that a corresponding fluid delivery pump delivered the first fluid at a rate greater than the first fluid delivery limit setting prior to adjustment of the first delivery limit setting.

The method may further include: displaying the first indication of receiving the excessive number of fluid delivery pump programming alerts associated with the first fluid identifier in response to detecting that the number of fluid delivery pump programming alerts associated with delivery of the first fluid is greater than an alert threshold level. The adjusted first fluid delivery limit setting can be transmitted to the multiple fluid delivery pumps. The limit may be a setting in which each respective fluid delivery pump of the multiple fluid delivery pumps (or fluid delivery management resource) generates a respective fluid delivery pump programming alert in response to detecting a corresponding instance of programming of the respective fluid delivery pump to deliver the first fluid at a rate greater than the adjusted first fluid delivery limit setting.

The methods as discussed herein may further include adjusting the first alert fluid delivery limit setting associated with the first fluid in response to receiving a command from a user viewing the display screen.

Adjusting the first fluid delivery limit setting for a fluid may include increasing the magnitude of the first fluid delivery limit setting; the increased magnitude of the first fluid delivery limit setting operative to reduce subsequent occurrences of the multiple fluid delivery pumps generating pump programming alerts associated with delivery of the first fluid.

The method may further include: displaying the first indication in response to detecting that the number of excessive number of fluid delivery pump programming alerts associated with the first fluid identifier is greater than a first alert threshold level associated with the first fluid.

In one example, the first fluid delivery limit or alert threshold level as discussed herein is a first percentage value specifying a threshold level associated with the first fluid, the first indication displayed on the display screen in response to detecting that greater than the first percentage value of multiple fluid devices are detected as delivering the first fluid above first fluid delivery limit setting.

The method may further include: transmitting the adjusted first fluid delivery limit setting to a first fluid delivery device in response to receiving input from the first fluid delivery device requesting to deliver the first fluid as specified by the first fluid identifier to a first recipient.

The method may further include: receiving feedback from fluid delivery pumps delivering the first fluid, the feedback indicating which portion of the fluid delivery pumps delivers the first fluid at a rate greater than the adjusted limit setting. The feedback may also include delivery information indicating rates or amounts that each fluid delivery device delivers the respective fluid to a recipient. The fluid delivery management resource can be configured to determine if the delivery rate or amount is above a respective soft upper limit or less than a soft lower limit associated with the fluid.

The method may further include: on the display screen, displaying a second indication in response to receiving an excessive number of fluid delivery pump programming alerts associated with the second fluid identifier.

The method may further include: adjusting a second fluid delivery limit setting associated with delivery of the second fluid in response to the excessive number of fluid delivery pump programming alerts associated with the second fluid identifier; and transmitting the adjusted second fluid delivery limit setting associated with the second fluid to each of multiple fluid delivery pumps requesting to deliver the second fluid to a respective recipient.

The system as discussed herein includes: communication management hardware operative to: on a display screen: i) display fluid identifiers including a first fluid identifier indicating a first fluid and a second fluid identifier specifying a second fluid, and ii) display a first indication of receiving an excessive number of fluid delivery pump programming alerts associated with the first fluid identifier; adjust a first fluid delivery limit associated with delivery of the first fluid in response to the excessive number of fluid delivery pump programming alerts associated with the first fluid identifier; and transmit the adjusted first fluid delivery limit associated with the first fluid to each of multiple fluid delivery pumps requesting to deliver the first fluid to a respective recipient.

Each of the fluid delivery pump programming alerts indicates that a corresponding fluid delivery pump delivered the first fluid at a rate greater than the first fluid delivery limit setting prior to adjustment of the first delivery limit setting.

The communication management hardware may be operative to: display the first indication of receiving the excessive number of fluid delivery pump programming alerts associated with the first fluid identifier in response to detecting that the number of fluid delivery pump programming alerts is greater than an alert threshold level.

The adjusted first fluid delivery limit setting transmitted to the multiple fluid delivery pumps is a setting in which each respective fluid delivery pump of the multiple fluid delivery pumps generates a respective fluid delivery pump programming alert in response to detecting a corresponding instance of programming of the respective fluid delivery pump to deliver the first fluid at a rate greater than the adjusted first fluid delivery limit setting.

The communication management hardware may be operative to: adjust the first alert fluid delivery limit setting associated with the first fluid in response to receiving a command from a user viewing the display screen.

The communication management hardware may be operative to: increase the magnitude of the first fluid delivery limit setting, the increased magnitude of the first fluid delivery limit setting operative to reduce subsequent occurrences of the multiple fluid delivery pumps generating pump programming alerts associated with delivery of the first fluid.

The communication management hardware may be operative to: display the first indication in response to detecting that the number of excessive number of fluid delivery pump programming alerts associated with the first fluid identifier is greater than a first alert threshold level associated with the first fluid.

The first fluid delivery limit setting or alert threshold level may be implemented as a percentage value.

The communication management hardware may be operative to: transmit the adjusted first fluid delivery limit setting to a first fluid delivery device in response to receiving input from the first fluid delivery device requesting to deliver the first fluid as specified by the first fluid identifier to a first recipient.

The communication management hardware may be operative to: receive feedback from fluid delivery pumps delivering the first fluid, the feedback indicating which portion of the fluid delivery pumps delivers the first fluid at a rate greater than the adjusted limit setting.

The communication management hardware may be operative to: on the display screen, display a second indication in response to receiving an excessive number of fluid delivery pump programming alerts associated with the second fluid identifier.

The communication management hardware may be operative to: adjust a second fluid delivery limit setting associated with delivery of the second fluid in response to the excessive number of fluid delivery pump programming alerts associated with the second fluid identifier; and transmit the adjusted second fluid delivery limit setting associated with the second fluid to each of multiple fluid delivery pumps requesting to deliver the second fluid to a respective recipient.

As further discussed herein, a fluid delivery pump is operative to: receive a programming parameter at a user interface; determine whether the programming parameter is within a range of parameter values; display an alert on the user interface if the programming parameter is outside the range of parameter values; receive an override of the alert or a change in the programming parameter; infuse the fluid to the recipient using the programming parameter or changed programming parameter; and a processing circuit configured to: receive fluid delivery pump data from the fluid delivery pump over a network communication, the fluid delivery pump data comprising an fluid identifier and an indication of the alert; determine whether a number of fluid delivery pump programming alerts including the received alert meets or exceeds a threshold for the fluid identifier; and generate display data for a screen comprising the fluid identifier and an indication that the number of fluid delivery pump programming alerts meets or exceeds the threshold.

The threshold may be a percentage of infusions of a fluid named by the fluid identifier having at least one alert.

The processing circuit may be configured to: receive a change to an alert limit of the fluid identifier having the indication; and reprogram the fluid delivery pump with the changed alert limit for the fluid identifier.

The range of parameter values may be stored in a drug library as hard and/or soft limits.

As further discussed herein, a method comprises: receiving feedback messages from multiple fluid delivery devices, each of which delivers a first type of fluid to a respective recipient; deriving an alert metric based on a portion of the feedback messages indicating delivery of the first type of fluid above a first threshold level, the alert metric indicating occurrences of the first fluid type being delivered above the first threshold level by the multiple fluid delivery devices; and in response to detecting that the alert metric is greater than a second threshold level, displaying a notification on a display screen, the notification indicating that the metric is greater than a threshold level.

Further examples herein include method comprising: on a display screen: i) displaying fluid identifiers including a first fluid identifier indicating a first fluid and a second fluid identifier specifying a second fluid, and ii) displaying a first indication of receiving an excessive number of fluid delivery pump programming alerts associated with the first fluid identifier; adjusting a first fluid delivery limit setting associated with delivery of the first fluid in response to the excessive number of fluid delivery pump programming alerts associated with the first fluid identifier; and transmitting the adjusted first fluid delivery limit setting associated with the first fluid to each of multiple fluid delivery pumps subsequently requesting to deliver the first fluid to a respective recipient.

Each of the fluid delivery pump programming alerts can be configured to indicate that a corresponding fluid delivery pump delivered the first fluid at a rate greater than the first fluid delivery limit setting prior to adjustment of the first delivery limit setting.

In accordance with further examples, the method includes displaying the first indication of receiving the excessive number of fluid delivery pump programming alerts associated with the first fluid identifier in response to detecting that the number of fluid delivery pump programming alerts is greater than an alert threshold level. The adjusted first fluid delivery limit setting transmitted to the multiple fluid delivery pumps may be a setting in which each respective fluid delivery pump of the multiple fluid delivery pumps generates a respective fluid delivery pump programming alert in response to detecting a corresponding instance of programming of the respective fluid delivery pump to deliver the first fluid at a rate greater than the adjusted first fluid delivery limit setting.

In still further examples, the fluid delivery management resource as discussed herein can be configured to adjust the first alert fluid delivery limit setting associated with the first fluid in response to receiving a command from a user viewing the display screen.

Yet further, adjusting the first fluid delivery limit setting may include increasing the magnitude of the first fluid delivery limit setting, the increased magnitude of the first fluid delivery limit setting operative to reduce subsequent occurrences of the multiple fluid delivery pumps generating pump programming alerts associated with delivery of the first fluid.

The fluid delivery management resource can be configured to display the first indication in response to detecting that the number of excessive number of fluid delivery pump programming alerts associated with the first fluid identifier is greater than a first alert threshold level associated with the first fluid.

Still further, the first fluid delivery limit setting is a first percentage value specifying a threshold level above the first alert threshold level associated with the first fluid, the first indication displayed on the display screen in response to detecting that greater than the first percentage value of multiple fluid devices are detected as delivering the first fluid above first fluid delivery limit setting.

In accordance with further examples, the fluid delivery management resource can be configured to transmit the adjusted first fluid delivery limit setting to a first fluid delivery device in response to receiving input from the first fluid delivery device requesting to deliver the first fluid as specified by the first fluid identifier to a first recipient.

The fluid delivery management resource can be configured to receive feedback from fluid delivery pumps delivering the first fluid, the feedback indicating which portion of the fluid delivery pumps delivers the first fluid at a rate greater than the adjusted limit setting.

The fluid delivery management resource further can be configured to, on the display screen, display a second indication in response to receiving an excessive number of fluid delivery pump programming alerts associated with the second fluid identifier.

The fluid delivery management resource can be configured to adjust a second fluid delivery limit setting associated with delivery of the second fluid in response to the excessive number of fluid delivery pump programming alerts associated with the second fluid identifier; and transmitting the adjusted second fluid delivery limit setting associated with the second fluid to each of multiple fluid delivery pumps requesting to deliver the second fluid to a respective recipient.

Yet further embodiments herein include a fluid delivery pump operative to: receive a selected programming parameter at a user interface; determine whether the programming parameter is within a range of parameter values; display an alert on the user interface if the programming parameter is outside the range of parameter values; receive an override of the alert or a change in the programming parameter; infuse the fluid to the person using the programming parameter or changed programming parameter; and a processing circuit configured to:

receive fluid delivery pump data from the fluid delivery pump over a network communication, the fluid delivery pump data comprising an fluid identifier and an indication of the alert; determine whether a number of fluid delivery pump programming alerts including the received alert meets or exceeds a threshold for the fluid identifier; and generate display data for a screen comprising the fluid identifier and an indication that the number of fluid delivery pump programming alerts meets or exceeds the threshold.

Yet further, the threshold may be a percentage of infusions of a fluid named by the fluid identifier having at least one alert. The processing circuit can be further configured to: receive a change to an alert limit of the fluid identifier having the indication; and reprogram the fluid delivery pump with the changed alert limit for the fluid identifier. The range of parameter values may be stored in a drug library as hard and/or soft limits.

Further examples as discussed herein include a method (such as executed by a fluid delivery management resource or other suitable entity) comprising: receiving feedback messages from multiple fluid delivery devices, each of which delivers a first type of fluid to a respective recipient; deriving an alert metric based on a portion of the feedback messages indicating delivery of the first type of fluid above a first threshold level, the alert metric indicating occurrences of the first fluid type being delivered above the first threshold level by the multiple fluid delivery devices; and in response to detecting that the alert metric is greater than a second threshold level, displaying a notification on a display screen, the notification indicating that the metric is greater than a threshold level.

Referring now to FIG. 1, a flow diagram of a system for collecting infusion data from a plurality of infusion pumps 10 at a server computer 20 will be described. Each of the infusion pumps 10 (a.k.a., fluid delivery devices) may be any of a variety of infusion pumps, such as a volumetric infusion pump, a patient-controlled analgesia (PCA) pump, an elastomeric pump, a syringe pump, an enteral or parenteral feeding pump, an insulin pump, etc.

At operation #1 in FIG. 1, each of the infusion pumps 10 is configured to collect infusion pump history data, such as user key presses on a user interface thereof, alarm data, etc. History data can include drug or infusate name, dose, dose changes, start time, stop time, alarm or alert information indicating a cross beyond so-called hard or soft upper or lower limits, etc. Alert data communicated from each of the pumps 10 to the server 20 (a.k.a., communication management hardware) may include an indication whether or not an alert was generated by the pump, a start time for the alert, a care area in which the pump was used during the alert, a drug name of a drug being administered during the alert, time to alert resolution, etc. The one or more alerts from each respective pump, if so generated, indicates if the respective pump is programmed by a caregiver to deliver fluid above a first soft fluid delivery limit, below a second soft fluid delivery limit, attempt to deliver fluid above a first hard fluid delivery limit, attempt to deliver fluid below a second hard fluid delivery limit, and so on.

At operation #2 in FIG. 1, infusion pump 10 may be configured for wired and/or wireless communication with a server computer 20. Each of pumps 10 and server computer 20 may comprise a network interface circuit configured for network communications, such as a Wi-Fi circuit, Bluetooth circuit, Ethernet card, or other network interface circuit. Pump 10 is configured to transmit and server 20 is configured to receive infusion pump data (such as fluid delivery alerts or other information as previously discussed) over the respective network interface circuits. Server 20 is configured to store the infusion data from a plurality of infusion pumps, which may be in different care areas, for analysis, whether automated or by a clinician. Infusion data transmissions may be initiated by infusion pump 10 and may occur periodically, intermittently, occasionally, every few minutes, several times per day, or at other regular or irregular frequencies. Infusion data stored at server 20 may be a subset of pump history data that server 20 receives from pump 10.

At operation #3 in FIG. 1, a person (a.k.a., user such as an fluid delivery system administrator 12) may log into server 20 using a terminal (such as display screen 130), which may be a user interface for server 20 or may alternatively be a separate computing device or PC. The user 12 opens an application configured to review infusion pump data. Server 20 may be configured to generate one or more reports based on analysis of the infusion pump history data. Reports may be generated in a prescheduled manner or on-demand based on user inputs to the system. Reports may also be sent automatically, without requiring user input, on a scheduled basis, or in response to certain rules being met (e.g., alert triggered, a certain number of alerts triggered, a certain number of override or reprogram events, etc.). The user may select one or more infusion data filters, such as hospital, data set, profile, drug, device type, infusion mode, time and/or date range, etc.

At operation #4 in FIG. 1, the server computer 20 generates the selected infusion data report or reports and display them on display screen 130.

At operation #5 in FIG. 1, a user (such as a fluid delivery system administrator) analyzes the report data (such as displayed on a display screen 130) and may make changes to a data set or library used to program infusion pumps 10. For example, a so-called data set may comprise hard limits and/or soft limits to different pump programming parameters, such as infusion rate, dose, infusion time or duration, etc. The limits (such as of the data set may be different for different drugs and may include a "drug X" data set for a drug not known by the data library. Once changes are made to the data set or library, server 20 may be used to remotely download, update, or otherwise program infusion pumps 10 (e.g., by care area, universally, etc.) with the new data set changed by the pharmacist or other user at operation #4.

Referring now to FIG. 2, an illustration of pump history data is provided. Each box 40, 42, 44, etc. represents one or more pump history data elements or events which may be independently reported from the infusion pump 10 to the server 20. For example, box 40 represents an indication that a user of a respective fluid delivery device selected a drug from a list or library of drugs on the infusion pump, which includes the name of the drug selected. Box 40 also represents an initial value of the pump parameter which is within upper and lower limits and which is changeable by a user (e.g., by scrolling up/down, or other input mechanism). Box 42 indicates that the user inputted to the infusion pump a parameter value which was outside of a prestored limit, namely an upper soft limit. The pump 10 then provided an indication that the parameter value was outside the upper soft limit ("LIMIT ALERT"). Infusion pump 10 then received an indication from the user that the input value was confirmed ("CONFIRM PARAMETERS") and an indication that the infusion was started ("START INFUSION"). Each of these indications can be a separate pump history data element stored in memory of the pump 10 and reported separately to server 20.

Thus each fluid delivery device in a fluid delivery network environment delivering respective fluid to a recipient monitors input from a caregiver providing fluid delivery settings to deliver respective fluid from that pump (fluid delivery device) to a corresponding recipient (human or non-human such as manufacturing equipment). If the caregiver controls the pump to deliver fluid greater than a soft fluid delivery limit or less than a soft fluid delivery limit, that pump generates a respective alert and communicates it to the server 20. Server 20 collects similar alerts form each of multiple fluid delivery devices delivering a common fluid such as fluid type #1. If the number of received alerts is greater than a threshold level (which may be a percentage value of total fluid delivery events of the fluid type #1), the server 20 generates a notification of the detected excessive alerts for display on the display screen 130. As further discussed herein, to reduce the number of excessive alerts associated with the fluid delivery devices delivering the fluid type #1, the administrator 12 can be configured to adjust the corresponding threshold level to a higher value such that there is no notification of detected excessive alerts.

Additionally, or alternatively, to reduce the number of excessive alerts associated with the fluid delivery devices delivering the fluid type #1 to respective recipients, the administrator 12 can be configured to adjust the corresponding upper soft fluid delivery limit and/or the corresponding lower soft fluid delivery limit. For example, increasing magnitude of the upper soft fluid delivery limit and/or decreasing the magnitude of the lower soft fluid delivery limit for subsequent delivery of fluid type #1 by the corresponding fluid delivery devices reduces the notification of excessive alerts because fewer fluid delivery devices report delivery of fluid type #1 outside the upper soft limit and lower soft limit.

More specifically, a hard limit may refer to a limit beyond which pump 10 does not allow a user to set a value of a fluid delivery parameter. In other words, if a respective caregiver attempts to operate corresponding pump to deliver fluid type #1 at a level greater than the upper hard limit, the fluid delivery device will provide a notification to the caregiver that the court responding selected setting will not be implemented because it is above a respective upper hard fluid delivery limit.

A soft limit as discussed herein may refer to a limit beyond which a pump 10 does allow a user to set a value of parameter, only after the user has been notified with an alert that the value is outside of the soft limit. For example, aa pharmacist may program hard and soft limits for different drugs in a drug library in order to guide a nurse, clinician or other user when programming parameters into infusion pump 10. Blocks 40-42 and 44-46 may be referred to as override events, because the history data comprises an indication that a user started an infusion on the pump at the parameter value which was outside of the prestored soft limit, or at the prestored hard limit.

In other words, if a respective caregiver selects delivery of a corresponding fluid between the upper soft limit and the upper hard limit as indicated by block 42, the fluid delivery device will deliver the corresponding fluid at the rate as specified by block 42. If a respective caregiver selects delivery of a corresponding fluid between the lower soft limit and the lower hard limit as indicated by block 46, the fluid delivery device will deliver the corresponding fluid at the rate as specified by block 46. As shown, delivery of the selected fluid (such as drug or non-drug) at block 42 results in a respective alert generated by the corresponding fluid delivery device to the server 20. The alert indicates that the caregiver operating the fluid delivery device delivers the first type of fluid to a respective recipient above the respective upper soft limit but less than the upper hard limit.

As further shown, delivery of the selected fluid (such as drug or non-drug) at block 46 results in a respective alert generated by the corresponding fluid delivery device to the server 20. The alert indicates that the caregiver operating the fluid delivery device delivers the first type of fluid to a respective recipient below the respective upper soft limit but greater than the lower upper hard limit.

An exemplary reprogram event is also illustrated in FIG. 2. Block 50 represents an infusion pump history data element comprising an indication that a user selected a particular drug or no-drug from the library. The initial value of the pump parameter may be a default parameter value, for example a parameter value from a previous infusion, a pre-programmed default value from the dataset/library, etc. Block 52 represents an indication that a user inputted to an infusion pump a parameter value which was outside of a prestored limit, namely an upper soft limit. Block 52 also represents an indication that the pump provided a confirmation or alert ("LIMIT ALERT") to the user and requested confirmation. Block 54 represents an indication that the user returned the infusion pump parameter value to within the prestored limit and the user started the infusion at the parameter value within the prestored limit. A similar illustration is provided for a reprogram event for a lower soft limit. A reprogram event may refer to a confirmation that a drug parameter value is outside of a predefined limit, such as an upper soft limit, that an alert or notification is provided, that the parameter value is returned to be within the predefined limits, and that the infusion is then started.

In other words, in this reprogram example, when a respective caregiver selects different delivery of a respective type #1 between the upper soft limit and the upper hard limit, the fluid delivery device communicates a respective limit alert to the server 20. Accordingly, the server 20 is notified of conditions in which each of the respective caregivers sets a respective fluid delivery device to deliver fluid #1 at a level greater than the upper soft limit the less than the upper hard limit associated with the respective selected fluid being delivered. Additionally, the server 20 is notified of conditions in which each of the respective caregivers sets a respective fluid delivery device to deliver fluid #1 at a level less than the lower soft limit and greater than the lower hard limit associated with the respective selected fluid being delivered.

FIG. 3 is a report of infusion records displayed on display screen 130 showing illustrative override events. This display screen 130 may be shown at a location remote from infusion pump 10, for example at a display device in communication with server 20 via a web-based user interface. A field 60 of the report 310 on the display screen 130 provides an indication that a server algorithm recognized a sequence of basic events that created an override event. In this case, a date and time of the override event is provided along with an indication that a pump programming value was input below a lower soft limit during a primary infusion. The values of a comparison are shown as confirmed value=0.01 mcg/min and limit value=1000 mcg/min. A field 61 shows that a user programmed a value (e.g., by scrolling the value) into pump 10 that crossed below the lower soft limit (LSL). A field 62 shows that the user confirmed the value outside of the soft limit, including again the date/time, event description and the value which was confirmed. A field 64 shows that a primary infusion was started, including date/time, as well as some additional parameters regarding the infusion, such as flow rate, volume to infuse, dose rate, dose infused and calculated duration of infusion. Data elements 61, 62 and 64 are pump history data received by server 20 from infusion pump 10. Additional events are shown, such as an end of the infusion below the lower soft limit (field 66) and an end of the infusion (field 68).

Each of the so-called override events (such as delivery of respective fluid outside of a range defined a soft lower limit and a soft upper limit) results in a respective alert from the fluid delivery device to the server 20 as previously discussed. Report 310 tracks occurrence of those events, which can be viewed by the administrator 12 if desired.

FIG. 4 is a report 410 of infusion records displayed on a display screen 130; the report shows an illustrative reprogram event. At a field 70, an indication is shown that a user inputted to an infusion pump (e.g., via a scrollable input or other input device) a parameter value which was outside of a prestored limit, thereby generating an alert. Specifically, the value of the parameter crossed above the upper soft limit of 4 mcg/h. At field 72, there is an indication that the pump confirmed to the user that the drug parameter value was outside the limit, which may be provided as an alert. This confirmation may include a message, notification, prompt or other indication provided on a screen of the infusion pump 10. In one example, the user is provided with a full screen alert on the pump, which may further comprise a change of color of one or more screen or display elements (e.g., LEDs near the screen, portions of the screen), a buzzer or other audible alarm, etc. The confirmation may further include a textual display indicating the value is outside the limit and a question as to whether the user wishes to proceed with that value and/or whether the user wishes to return to a value within the limit (which value may also be displayed for user selection). At field 74, there is an indication that the user returned the drug parameter value to within the limit. At field 76, there is an indication that the user started infusion on the pump to start the infusion at the parameter value within the prestored limit (e.g., at a Dose Rate of 3.9 mcg/min in this example). Field 76 shows additional pump history data associated with the event, namely a flow rate, a volume infused, a volume to infuse, a dose rate, a dose infused, and a calculated duration the infusion will take.

The pump history data illustrated in FIGS. 3 and 4 need not be displayed in all examples. In some examples, this pump history data is received from one or more pumps and stored in memory of server 20 for analysis.

FIG. 5 is a report 510 displayed on display screen 130; the report 510 indicates an override listing according to an illustrative example. The override listing report 510 may display a list of soft limit overrides with one or more of the following information for each override: Override Start Time 80, Override End Time 82, Location of pump that generated Override 84, Dataset used when Override occurred 86, Selected Profile used when Override occurred 88, Drug used when Override occurred 90 and a description of the Override itself 92. In one example, server 20 is configured to analyze the infusion pump history data described above with reference to FIG. 3 to determine that an override event has occurred. For example, server 20 may determine that a pump parameter value was programmed outside of a soft limit, an alert or notification was provided, the parameter value was confirmed by the user, and the infusion was started. Server 20 may be configured to determine based on this collection or series of events that an override event has occurred, and server 20 may be configured to generate a record in memory comprising one or more of data elements 80-92 regarding the override event.

FIG. 5 illustrates useful features that allow a pharmacist or other user to sort, filter, and/or display the data in a manner that allows the pharmacist to make conclusions about how and when overrides are occurring. These conclusions can assist the pharmacist in making future revisions to drug libraries for pumps. For example, a time filter input field 94 which allows the user to filter the override listing based on a selected period of time (e.g., prior 30 days to today, prior 30 days to an input date, etc.). A report type input device 96 allows a user to select among different report types, such as an override listing (FIG. 5), a reprogram list report (FIG. 6), a hard limit override listing report (FIG. 7), etc. Additional filter input fields 98 allow a user to filter based on other data elements, such as hospital 84, data set 86, profile 88, drug 92, device type, infusion mode, etc. In one example, an override listing 100 indicates that an override below a lower soft limit (LSL) occurred at a certain date and time at Forth Valley hospital on a pump that was running Dataset 12 with a profile of pediatric patients 19 kg or below for the drug Dopamine. One of the data fields, such as Override Start Time, may be selectable to navigate to the detailed infusion record during which the override event occurred.

In some examples, a computer-implemented method for reducing infusion pump programming alerts from an infusion pump may be implemented.

Figure 6:
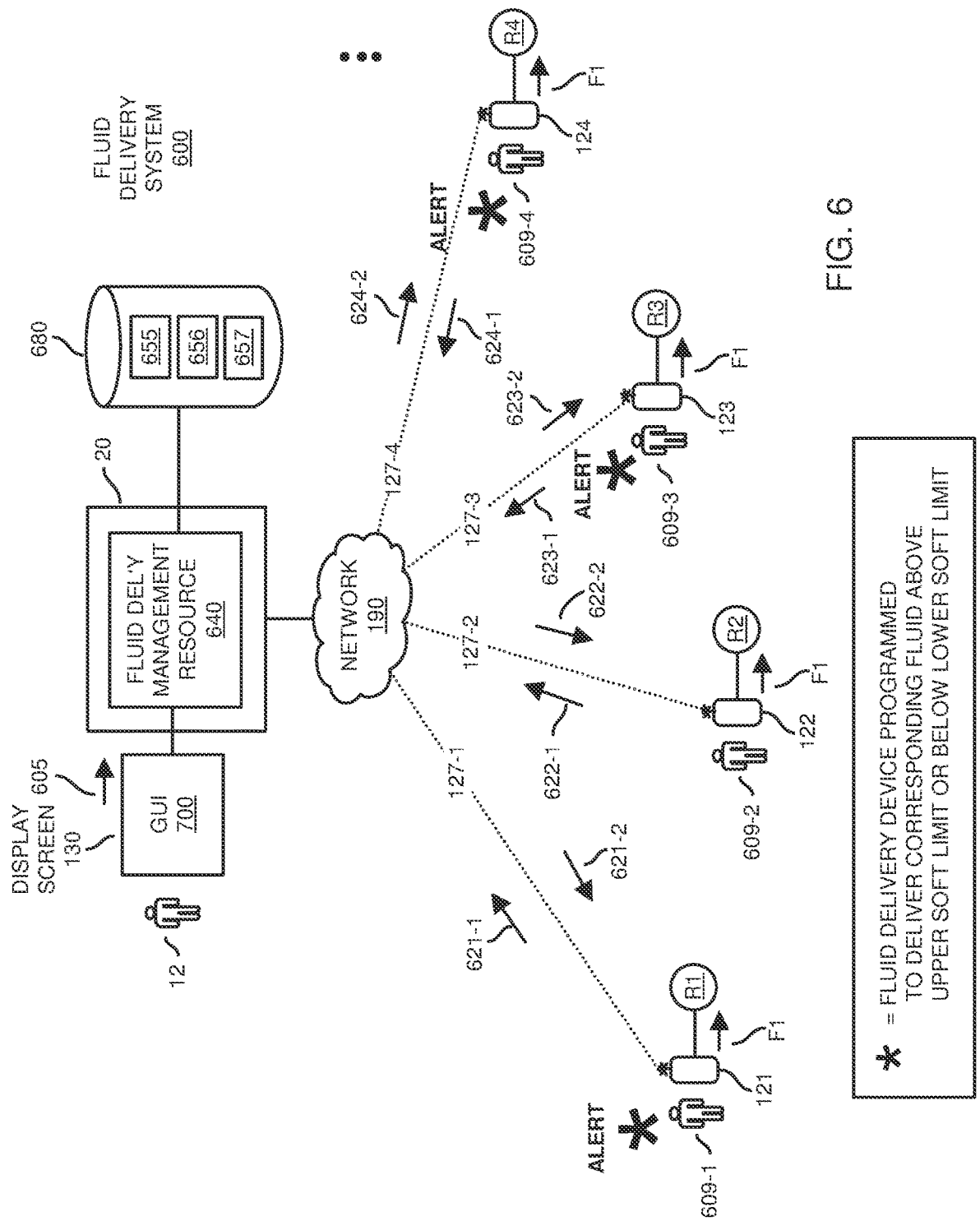
FIG. 6 is an example diagram illustrating a fluid delivery system and corresponding communications as discussed herein.

FIG. 6 is an example diagram illustrating monitoring of fluid delivery and management of alerts as discussed herein.

In this example, the fluid delivery system 600 includes server 20, fluid delivery management resource 640, repository 680, display screen 130, network 190, fluid delivery device 121, fluid delivery device 122, fluid delivery device 123, fluid delivery device 124, and so on.

Note that the fluid delivery management resource 640 can be implemented as fluid delivery management hardware, fluid delivery management software, or a combination of fluid delivery management hardware and fluid delivery management software. Each of the fluid delivery devices can be implemented as fluid delivery hardware, fluid delivery software, or a combination of fluid delivery hardware and fluid delivery software.

The fluid delivery management resource 640 monitors delivery of fluid by each of multiple different fluid delivery devices.

For example, the fluid delivery device 121 is operated by caregiver 609-1 to deliver respective fluid to a recipient R1 (such as a manufacturing process, person, etc.). To deliver fluid to the recipient R1, the caregiver 609-1 communicates with the fluid delivery management resource 640 over the communication link 127-1 and network 190. Via communications 621-1 over the communication link 127-1 and network 190 to the fluid delivery management resource 640, the caregiver 609-1 operates the fluid delivery device 121 to access a respective library 655 of available fluids. A list of corresponding fluids available for delivery to the recipient R1 is displayed on a respective display screen of the fluid delivery device 121. The caregiver 609-1 inputs selection of fluid type F1. In response to the selection, the caregiver 609 receives fluid delivery instructions (such as control settings) via communications 621-2. The instructions in the communications 621-2 can include any information such as the selected fluid (such as fluid type F1) for delivery to the recipient, confirmation that the fluid F1 should be delivered to the recipient R1, amount of fluid to deliver, prescription information, rate of fluid to deliver fluid type F1 to recipient R1, upper and lower soft delivery limits associated with delivering the fluid F1, upper and lower hard delivery limits associated with delivery of the fluid F1, and so on. Assume in this example that the soft upper limit associated with fluid F1 is 250 mcg (such as micrograms) and the soft lower limit is 25 mcg. Assume further that the caregiver 609-1 programs the fluid delivery device 121 to deliver the selected fluid F1 at a rate or amount greater than an upper soft limit (such as 250 mcg or micrograms) or below a lower soft limit (such as 25 mcg or micrograms) for the fluid F1 as indicated by the fluid delivery information provided by the fluid delivery management resource 640 via communications 621-1. In such an instance, in response to detecting delivery of corresponding fluid F1 to recipient R1 greater than the upper soft limit or below the lower soft limit for the fluid F1, the fluid delivery device 121 communicates a respective alert condition (such as fluid delivery pump programming alert) for the fluid delivery setting from the fluid delivery device 121 to the fluid delivery management resource 640 via communications 621-1. The fluid delivery management resource 640 tracks occurrence of the fluid delivery pump programming alert associated with fluid delivery device 121 via status information 656. For example, the fluid delivery management resource 640 produces a respective count value indicating how many of the fluid delivery devices in the fluid delivery system 600 experiences a fluid delivery pump programming alert in which respective fluid delivery devices are programmed to provide delivery of fluid F1 greater than the soft upper limit.

As further shown, the fluid delivery device 122 is operated by caregiver 609-2 to deliver respective fluid to a recipient R2. To deliver fluid to the recipient R2, the caregiver 609-2 operates the fluid delivery device 122 to communicate with the fluid delivery management resource 640 over the communication link 127-2 and network 190. Via communications 622-1 over the communication link 127-2 and network 190 to the fluid delivery management resource 640, the caregiver 609-2 operates the fluid delivery device 122 to access a respective library 655 of available fluids. A list of corresponding fluids available for delivery to the recipient R2 can be display on a respective display screen of the fluid delivery device 122. The caregiver 609-2 inputs selection of fluid type F1. In response to the selection, the caregiver 609-2 receives fluid delivery instructions via communications 621-2 from the fluid delivery management resource 640. The instructions in the communications 621-2 can include any information such as the selected fluid (such as fluid type F1) for delivery to the recipient R2, confirmation that the fluid F1 should be delivered to the recipient R2, amount of fluid to deliver, prescription information, rate of fluid to deliver fluid type F1, upper and lower soft delivery limits associated with delivering the fluid F1, upper and lower hard delivery limits associated with delivery of the fluid F1, and so on.

Assume in this example that the caregiver 609-2 programs the fluid delivery device 121 to deliver the selected fluid F1 at a rate or amount within the lower soft limit (such as 25 mcg or micrograms) and the upper soft limit (such as 250 mcg or micrograms) for the fluid F1 as indicated by the fluid delivery information provided by the fluid delivery management resource 640 via communications 622-1. In such an instance, there is no alert condition tracked by the fluid delivery management resource 640 for delivery of fluid F1 by the fluid delivery device 122 because delivery of the fluid by the fluid delivery device 122 falls within the range of the soft lower limit of 25 mobile communication device and the soft upper limit of 250 mcg.

As further shown, the fluid delivery device 123 is operated by caregiver 609-3 to deliver respective fluid to a recipient R3 (such as a manufacturing process, person, etc.). To deliver fluid to the recipient R3, the caregiver 609-3 communicates with the fluid delivery management resource 640 over the communication link 127-3 and network 190. Via communications 623-1 over the communication link 127-3 and network 190 to the fluid delivery management resource 640, the caregiver 609-3 operates the fluid delivery device 123 to access a respective library 655 of available fluids. A list of corresponding influence available for delivery to the recipient R3 can be display on a respective display screen of the fluid delivery device 123. The caregiver 609-3 inputs selection of fluid type F1. In response to the selection, the caregiver 609 receives fluid delivery instructions via communications 623-2. The instructions in the communications 623-2 can include any information such as the selected fluid (such as fluid type F1) for delivery to the recipient, confirmation that the fluid F1 should be delivered to the recipient R3, amount of fluid to deliver, prescription information, rate of fluid to deliver fluid type F1, upper and lower soft delivery limits associated with delivering the fluid F1, upper and lower hard delivery limits associated with delivery of the fluid F1, and so on.

Assume in this example that the caregiver 609-3 programs the fluid delivery device 123 to deliver the selected fluid F1 at a rate or amount greater than an upper soft limit (such as 250 mcg or micrograms) or below a lower soft limit (such as 25 mcg or micrograms) for the fluid F1 as indicated by the fluid delivery information provided by the fluid delivery management resource 640 via communications 623-1. In such an instance, in response to detecting delivery of corresponding fluid F1 to recipient R3 greater than the upper soft limit or below the lower soft limit for the fluid F1, the fluid delivery device 123 communicates a respective alert condition (such as fluid delivery pump programming alert) for the fluid delivery setting to the fluid delivery management resource 640 via communications 623-1. The fluid delivery management resource 640 tracks occurrence of the fluid delivery pump programming alert associated with fluid delivery device 123 via status information 656. For example, the fluid delivery management resource 640 produces a respective count value indicating how many of the fluid delivery devices in the fluid delivery system 600 experiences a fluid delivery pump programming alert.

As further shown, the fluid delivery device 124 is operated by caregiver 609-4 to deliver respective fluid to a recipient R4 (such as a manufacturing process, person, etc.). To deliver fluid to the recipient R4, the caregiver 609-4 communicates with the fluid delivery management resource 640 over the communication link 127-4 and network 190. Via communications 624-1 over the communication link 127-4 and network 190 to the fluid delivery management resource 640, the caregiver 609-4 operates the fluid delivery device 124 to access a respective library 655 of available fluids. A list of corresponding influence available for delivery to the recipient R4 can be display on a respective display screen of the fluid delivery device 124. The caregiver 609-4 inputs selection of fluid type F1. In response to the selection, the caregiver 609 receives fluid delivery instructions via communications 624-2. The instructions in the communications 624-2 can include any information such as the selected fluid (such as fluid type F1) for delivery to the recipient, confirmation that the fluid F1 should be delivered to the recipient R4, amount of fluid to deliver, prescription information, rate of fluid to deliver fluid type F1, upper and lower soft delivery limits associated with delivering the fluid F1, upper and lower hard delivery limits associated with delivery of the fluid F1, and so on.

Assume in this example that the caregiver 609-4 programs the fluid delivery device 124 to deliver the selected fluid F1 at a rate or amount greater than an upper soft limit (such as 250 mcg or micrograms) or below a lower soft limit (such as 25 mcg or micrograms) for the fluid F1 as indicated by the fluid delivery information provided by the fluid delivery management resource 640 via communications 624-1. In such an instance, in response to detecting delivery of corresponding fluid F1 to recipient R4 greater than the upper soft limit or below the lower soft limit for the fluid F1, the fluid delivery device 124 communicates a respective alert condition (such as fluid delivery pump programming alert) for the fluid delivery setting to the fluid delivery management resource 640 via communications 624-1. The fluid delivery management resource 640 tracks occurrence of the fluid delivery pump programming alert associated with fluid delivery device 124 via status information 656. For example, the fluid delivery management resource 640 produces a respective count value indicating how many of the fluid delivery devices in the fluid delivery system 600 experiences a fluid delivery pump programming alert.

In a similar manner, the fluid delivery management resource monitors many instances of fluid delivery devices in the fluid delivery system 600 delivering many different types of fluids to recipients. The fluid delivery management resource tracks occurrences of the alert conditions and generates a respective overall alert for the fluid F1 in response to detecting that a number of the fluid delivery devices delivers the fluid F1 outside a range between the soft lower limit and the soft upper limit.

As further discussed herein, the fluid delivery management resource 640 can be configured to track the percentage of fluid delivery devices that deliver the fluid type F1 to a respective recipient R1 above the upper soft limit associated with the fluid F1$n$ or below the lower soft limit for the fluid F1. As previously discussed, based on fluid delivery control information received from the fluid delivery management resource, the fluid delivery devices prevent the caregiver (or fluid delivery pump operator) from delivering the fluid F1 above the upper hard limit or below the lower hard limit.

Thus, the fluid delivery management resource 640 receives feedback messages (such as communications 621-1, 622-1, 623-1, and so on, from multiple fluid delivery devices, each of which delivers a first type of fluid to a respective recipient. The feedback indicates delivery of the fluid F1$n$ outside an acceptable range (such as between the soft lower limit and the soft upper limit). The fluid delivery management resource 640 derives an alert metric based on a portion of the feedback messages (such as messages from fluid delivery device 121, fluid delivery device 123, fluid delivery device 124, and so on) indicating delivery of the first type of fluid F1 above a first threshold level such as soft upper limit of 250 mcg and/or below a second threshold level such as soft lower limit of 25 mcg.

In one example, the alert metric is based on a number of occurrences of the first fluid type F1 being delivered above the first threshold level (such as 250 mcg) by the multiple fluid delivery devices. In response to detecting that the number of occurrences of the first fluid type F1 being delivered above the first threshold level 250 mcg is greater than a second threshold level (such as 5%) amongst a sample set of fluid delivery devices delivering the fluid F1, the fluid delivery management resource 640 displays a notification (such as visual indication or alter indicator 602) on a display screen 130 (see FIG. 7). The notification such as alert indicator 602 indicates that the alert metric (such as a value of 10%) indicating that 10% of the fluid delivery devices in the sample set deliver the fluid F1 above the soft upper limit threshold level of 250 mcg; the alert metric of 10% is greater than the second threshold level of 5%.

Figure 7:
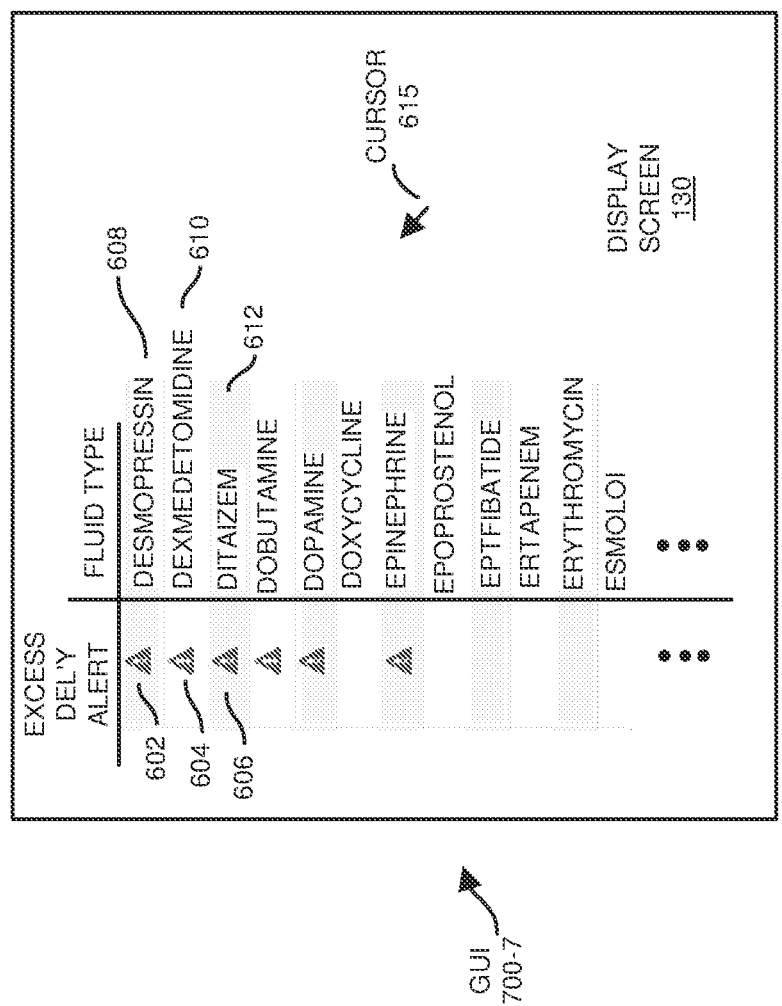
FIG. 7 is a display screen of a list of infusate identifiers and excessive alert indicators, according to an illustrative example.

FIG. 7 is a graphical user interface 700-7 on display screen 130 as discussed herein. The graphical user interface 700-8 illustrates display of a list of fluid identifiers 600 (fluid type identifiers) and excessive alert indicators 602, 604, 606, etc. For example, fluid type F1 as previously discussed may be DESMOPRESSIN (fluid 608). As previously discussed in FIG. 6, the fluid delivery management resource 640 tracks how many alerts occur based on delivery of the fluid type F1 by a set of fluid delivery devices. In response to detecting that a percentage of a sample pool of the fluid delivery devices as previously discussed delivering the fluid F1 greater than the upper soft limit and/or below the lower soft limit is above a respective percentage threshold level, the fluid delivery management resource 640 generates the respective alert indicator 602 and displays it next to the fluid identifier 608 to indicate excessive alerts.

Display data for the display screen 130 and corresponding graphical user interface 700-7 may be generated by server computer 20 (such as fluid delivery management resource 640) or other suitable entity. The fluid identifiers 608 (such as fluid Desmopressin), 610 (such as Dexmedetomidine), 612 (such as dilTIAZem) may be identifiers of drugs, medicaments, or other infusates, or fluids, which identify a drug in a drug library that can be infused by the fluid delivery devices to deliver fluid. The list 600 can be configured to include any number of infusate (fluid) identifiers such as at least three infusate identifiers, at least ten infusate identifiers, or other numbers of infusate identifiers on a single display screen. Server 20 and corresponding fluid delivery management resource 640 may be configured to generate list 600 (of available fluids for delivery via a respective fluid delivery device) based on fluid delivery device (or fluid delivery pump) history data received from one or a plurality of infusion pumps (a.k.a., fluid delivery devices) in one or more care areas of a clinic, or even from multiple clinics. Server 20 may further be configured to retrieve from memory and display indications of excessive infusion pump programming alerts such as alert indicators 602, 604, 606 with each of the plurality of the fluid identifiers.

Note that the alert indicators 602, 604, 606, etc., are shown in this example as icons comprising a triangle with an exclamation point. Note that other indicator symbols are contemplated for use in graphical user interface 700-7, such as a circle or octagon with or without an exclamation point (as shown in FIG. 7). The indicators may be provided near the infusate identifier in a manner that a viewer can readily observe the indicator is associated with the infusate identifier.

For example, alert indicator 602 is displayed next to fluid identifier 608 such as fluid Desmopressin; alert indicator 604 is displayed next to fluid identifier 610 such as fluid Dexmedetomidine; alert indicator 606 is displayed next to fluid identifier 612 such as fluid diltiazem; and so on.

In still other examples, fluid pump delivery alert indicators 602, 604, 606, etc., may comprise a visual distinction of characters of the infusate identifier, such as bold, italics, underlining, change in color, change in font, highlighting around the characters, etc.

In some examples, server 20 (a.k.a., fluid delivery management resource 640) can be configured to receive a change to one or more alert limit of one of the plurality of infusate identifiers, as described with reference to operation #5 of FIG. 1. Server 20 and corresponding fluid delivery management resource 640 may be configured to transmit the changed alert limit to the infusion pump, for example as part of a drug library data set update. In this manner, infusion pump programming alerts can be reduced, for example, by enlarging (increasing a magnitude of) the range of acceptable parameter values based on the data viewed on the display screen of FIG. 7.

Figure 8:
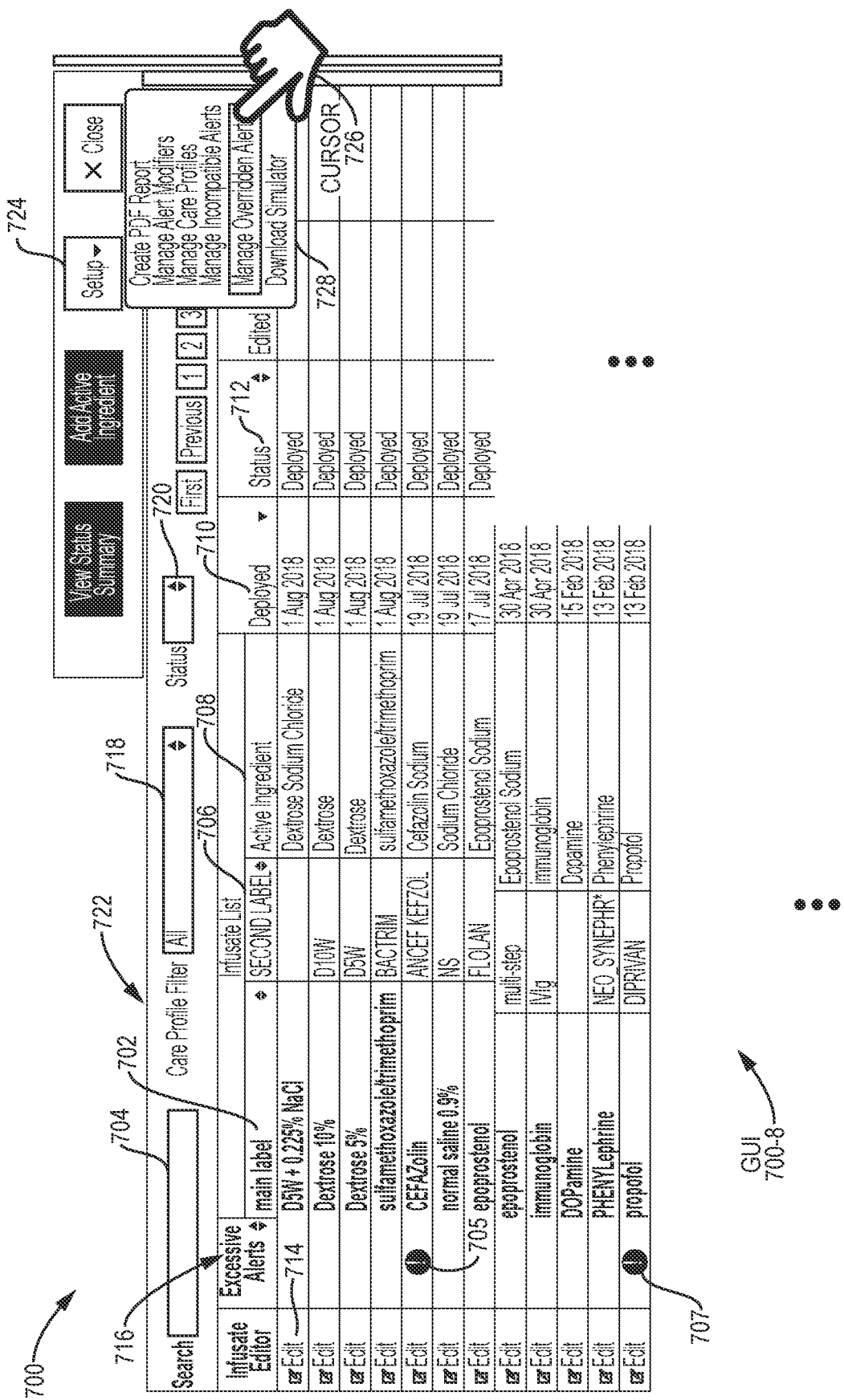
FIG. 8 is a display screen of a list of infusate identifiers and excessive alert indicators along with a setup screen selection, according to an illustrative example.

FIG. 8 is a graphical user interface 700-8 on a display screen 130. The graphical user interface 700-8 displays a list of fluid identifiers 702 and excessive alert indicators 704 in a similar manner as previously discussed. The list may include the information in graphical user interface 700-7. Other data associated with fluids may be provided, such as a second label 706, an active ingredient 708, a date the drug was deployed or updated in a drug library 710, a status of being deployed or not deployed (i.e., pending) 712, and other data. A user such as administrator 12 may sort the fluids using sort buttons shown in header 722. Each fluid entry may comprise an Edit button 714 to allow a user (i.e., user 12) to edit parameters of the infusate for a drug library, for example by taking the user to a different screen or by making display fields editable on screen 130. As further shown, fluids such as infusates can be searched using a search bar 716 and/or filtered using a care profile filter 718 (e.g., ICU, NICU, primary care, etc.), a status filter 720 (e.g., deployed, etc.), or other filters.

Display screen 130 displaying graphical user interface 700-8 may further comprise a Setup drop-down menu button 724. Selecting button 724 with selector 726 (i.e., cursor) orepd by user 12 results in display of a drop-down menu 728 allowing a user 12 to perform various setup procedures such as creating a PDF report of the infusate data, managing alert modifiers, managing care profiles, etc. Selecting Manage Overridden Alerts (management of fluid delivery programming alerts) results in the fluid delivery management resource 640 producing the graphical user interface 700-9 in FIG. 9. Assume that the user 12 operating the cursor 726 selects management of fluid F1 in graphical user interface 700-7 in FIG. 7.

Figure 9:
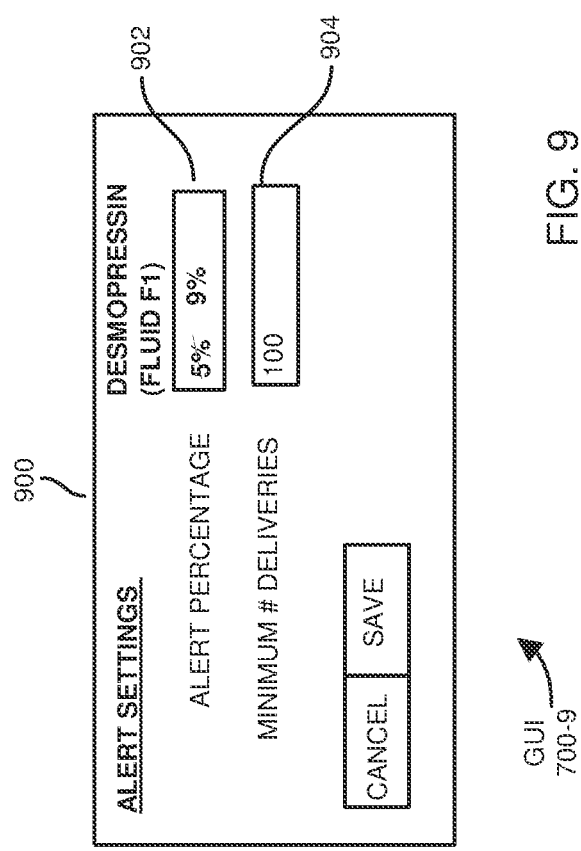
FIG. 9 is a display screen showing excessive alert settings and adjustments, according to an exemplary example.

FIG. 9 is a display screen showing a plurality of excessive alert indicators for selected fluid F1 (such as DESMOPRESSIN) as discussed herein. Server 20 and corresponding fluid delivery management resource 640 can be configured to store settings for one or more definitions of excessive alerts for each of different types of fluids that can be delivered by the fluid delivery devices in the fluid delivery system 600. In some cases, the definitions of acceptable limits (program delivery settings) may be provided by a manufacturer and optionally hard coded to avoid changing by a user. In other cases, the settings may be user-selectable by pump, by care area, by facility, etc.

In the example shown in FIG. 9, an excessive alerts settings screen in graphical user interface 700-9 is shown as having an alert percentage field 902 for receiving a user input of a percentage. Originally, the setting for alert percentage is 5%. Assume that the fluid delivery management resource 640 implemented the setting of 5% to generate a respective excessive fluid delivery programming alerts associated with the delivery of fluid F1n as previously discussed with respect to FIG. 6. In other words, excessive alerts associated with the delivery of fluid F1 by the fluid delivery devices resulted in display of as indicated by in an excess number of alerts (display excessive alert identifiers 602 in FIG. 7). The percentage (5%) in data flow 902 of FIG. 9 may represent a number of alerts per infusions of a particular infusate in the infusion history data. In other examples, the percentage may represent the number of infusions having at least one alert. In various examples, the data set from which the percentage or percentages is calculated may also be user-defined on this screen or other screens. For example, the user may define the data set as comprising all infusion history data in the previous day, week, month and/or all infusion history data from one or more user-selected care areas. In another example, the user may define the data set as comprising all infusion history data since the last time infusion history data was cleared by user input. The scope of alerts considered in the percentage may also be user defined. For example, the alerts counted in the percentage may comprise alerts that led to overrides only, alerts that led to reprograms only, alerts that led to both overrides and reprograms, alerts other than overrides and reprograms, etc.

A minimum number of infusions input data field 904 may also be provided. The fluid delivery management resource 640 can be configured to determine whether to indicate excessive infusions based on whether the minimum number of infusions for the particular fluid (such as fluid F1) exceeds the number or percentage entered into input field 904. Server 20 may further be configured to receive one or more definitions of a number of infusions, such as all infusions programmed, only infusions started, only infusions completed, etc.

In the example shown, the original setting for the alert threshold level associated with the fluid F1 is 5%. As previously discussed in FIG. 6, more than 5% of the fluid delivery devices delivering the fluid F1 (as in FIG. 6) resulted in a fluid delivery programming alert communicated to the fluid delivery management resource 640. The fluid delivery management resource 640 counts the occurrences. Assume that the user 12 wishes to reduce the number of alerts associated with delivery of the fluid F1. One way to reduce the respective number of excessive alerts is to increase the alert percentage value in the data field 902. For example, the user 12 overwrites the value of 5 percent to a value of 9 percent in the data field 902. A user or other suitable entity has entered 100 (minimum pool of fluid delivery devices that are needed to test for an excessive alert condition) in field 904. A user may click a SAVE button to save these settings. Based on these new settings, the fluid delivery management resource 640 generates the respective alert condition associated with fluid F1 in response to a condition in which greater than 9 percent of a pool of more than 100 fluid delivery devices subsequently delivering the fluid F1 to respective recipients delivers the fluid F1 above the soft upper limit. In theory, the adjustment such as increasing the alert percentage 5 percent to 9 percent lowers the likelihood that a respective excessive delivery alert will be subsequently generated for the fluid F1.

Different definitions may be saved for different care areas. Server 20 and corresponding fluid delivery management resource 640 may then be configured to generate an indication of excessive infusion pump programming alerts on one or more display screens when 9 percent of infusions programmed for a specific drug and/or dose limit generates an alert AND the minimum number of infusions exceeds 100.

In an alternate example, user input fields 902 and/or 904 may be provided on the same screen as a listing of fluid identifiers. For example, the user input fields 902 and/or 904 may be additional data columns, each having respective headers 722 (FIG. 7).

Figure 10:
FIG. 10 is a display screen and corresponding graphical user interface showing a plurality of excessive alert indicators for a single infusate, according to an illustrative example.

FIG. 10 is a display screen and corresponding graphical user interface 700-10 showing a plurality of excessive alert indicators for a single infusate, according to an illustrative example. Display screen 1000 may be presented as a separate display screen from screen 700 and may be presented in response to a user selecting the edit button 714 of a particular infusate. In some examples, server 20 may be configured to receive from a user a selection of one of the fluid identifiers having an excessive infusion pump programming alert, by selection of the corresponding edit button 714 or by clicking on any one or more of the columns of the row associated with the infusate identifier 702. Server computer 20 may be configured, in response to receiving the user selection, to display second display screen 1000 which is different than first display screen 700 and which comprises an indication of excessive infusion pump programing alerts with each of a plurality of programming limit identifiers (1002, 1004, 1006, etc.). Programming limit identifiers may comprise a bolus dose limit identifier 1002, a bolus dose rate limit identifier 1004, a dose rate limit identifier 1006, a volumetric rate limit identifier (not shown) and/or other programming limit identifiers. In this example, the identifiers are shown as line or bars showing soft limits within a range of potential values. For example, bolus dose limit identifier 1002 shows a lower soft limit of 25 mcg and an upper soft limit of 250 mcg. Limit identifier 1002 is a graphical illustration of soft limits in a data set of infusion pump history data for a particular infusate. In some examples the plurality of programming limit identifiers may comprise both hard limits which are not to be overridden and soft limits which may be overridden.

Each of programming limit identifiers 1002, 1004, 1006 may comprise a respective indication 1008, 1010, 1012 of excessive programing alerts (such as a certain percentage of fluid delivery devices in a sample pool delivering fluid outside a respective range). For example, the fluid delivery management resource 640 generates the alert 1002 in response to detecting a number of fluid delivery devices delivering the fluid F1 outside the range between 125 and 250 is greater than a corresponding percentage threshold level; the fluid delivery management resource 640 generates the alert 1004 in response to detecting a number of fluid delivery devices delivering the fluid F1 outside the range between 125 and 250 is greater than a corresponding percentage threshold level; the fluid delivery management resource 640 generates the alert 1006 in response to detecting a number of fluid delivery devices delivering the fluid F1 outside the range between 25 and 450 is greater than a corresponding percentage threshold level; and so on.

The indications may be graphic and/or textual, an icon, or visually distinctive font such as bold, italics, highlighting, etc. The indications may be disposed near their respective identifiers 1002, 1004, 1006, for example below, above or to the side of the identifiers 1002, 1004, 1006. The server computer may be configured to receive a user selection of one of the plurality of programming limit identifiers via selector 1026 and, in response to receiving the user selection, display on a display screen 1100 (FIG. 11) different than the other display screens a number representative of infusion pump programming alerts associated with the selected programming limit identifier.

Figure 11:
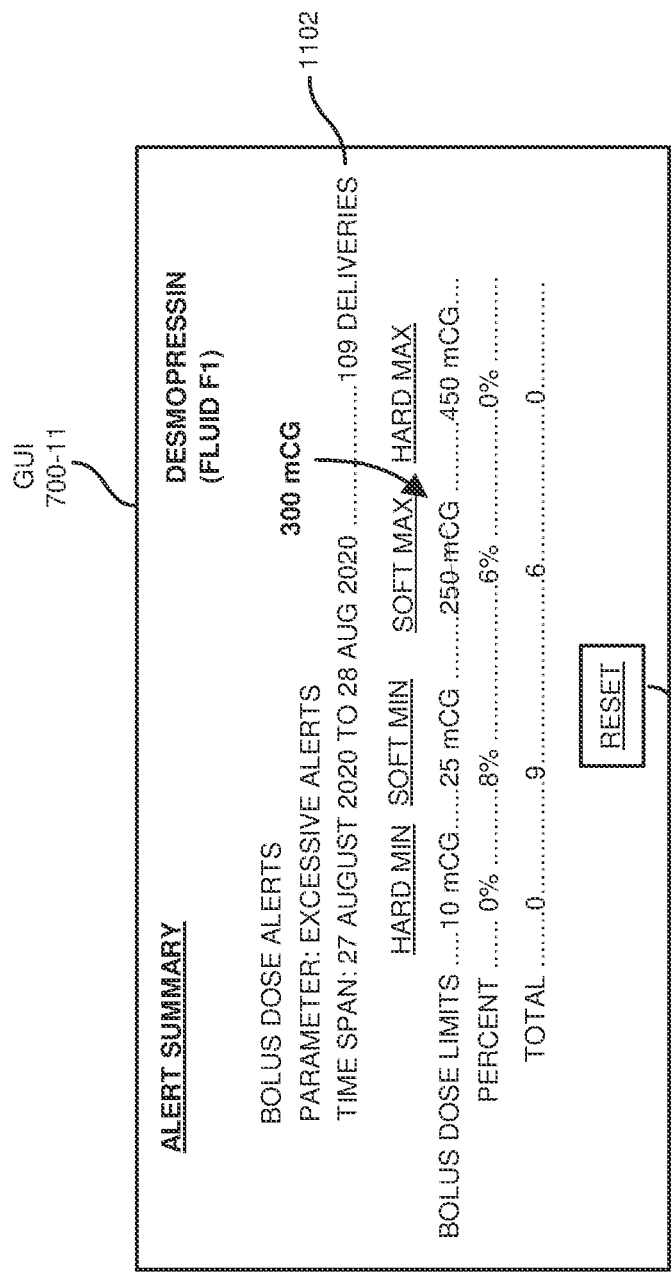
FIG. 11 is a display screen and graphical user interface for managing of an alert summary screen, according to an illustrative example.

As shown in FIG. 11, the number of alerts may comprise a number of alerts for programming below a soft limit minimum in the predefined data set, e.g., nine in FIG. 11. The number of alerts may comprise a number of alerts for programming above a soft limit maximum, e.g., 6% in FIG. 11. Display screen 1100 may further display a percentage representing the number of alerts over a number of infusions in the data set from which the data is derived. For example, display 1100 may show that 8% of the infusions had an alert for programming below a soft minimum limit (soft lower limit) and 6% of infusions had an alert for programming above a soft maximum limit (soft upper limit). A number and percentage of alerts for programming below a hard minimum and/or above a hard maximum may also be displayed. A number of infusions 1102 in the data set may also be displayed.

Server 20 (a.k.a., fluid delivery management resource 64) may also be configured to display a button for clearing one or more excessive alert indicators. Server 20 and corresponding fluid delivery management resource 640 may be configured to receive a user request via display screen 1100 to clear the indication of excessive infusion pump programming alerts for the selected infusate identifier from any or all of the display screens. For example, after a clinician has adjusted programming limits in a drug library, the clinician may wish to clear the alert indicators from display screens 700, 1000, and/or 1100 and begin again collecting alert data in a new data set to determine if additional excessive alert conditions are triggered.

Further Example

As shown in graphical user interface 700-7 in FIG. 7, the fluid delivery management resource 640 i) displays fluid identifiers 608 and 610 including a first fluid identifier 602 indicating a first fluid (such as fluid F1 or DEMOSPRESSIN) and a second fluid identifier 604 specifying a second fluid (such as DEXMEDETOMIDINE of fluid F2). The fluid delivery management resource 640 displays a first visual indication (such as alert indicator 602) in response to receiving an excessive number of fluid delivery pump programming alerts associated with the first fluid identifier 602. The fluid delivery management resource 640 in FIG. 6 detects that amongst the population of fluid delivery devices that deliver the fluid F1, greater than a threshold level of 5% of fluid delivery devices in the pool deliver the fluid F1 at a level greater than the upper soft limit of 250 mcg. Thus, the fluid delivery management resource 640 displays the first indication (such as alert indicator 602 in response to detecting that the excessive number of fluid delivery pump programming alerts associated with the first fluid identifier is greater than a first alert threshold level (such as 5%) associated with the first fluid FIG. 1.

In such an instance, the user 12 provides input (such as a command) to the fluid delivery management resource 640 to adjust one or more of the threshold level of 5% or the upper soft limit of 250 mcg associated with the fluid F1. Based on the input, which is received from the user or other suitable entity in response to the detecting the excessive number of fluid delivery pump programming alerts associated with the first fluid identifier F1, the fluid delivery management resource 640 adjusts a first fluid delivery limit setting (such as increase of the threshold level from 5% to 10% or increase of the upper soft limit from 250 to 300 mcg).

Subsequent to changing the first fluid delivery limit setting from 250 to 300, for a new pool of fluid delivery devices delivering the first fluid F1 to respective recipients, the fluid delivery management resource 640 implements the adjusted first fluid delivery limit setting (such as soft upper limit of 300 mcg instead of 250 mcg) associated with the first fluid F1 for each of multiple fluid delivery pumps subsequently requesting to deliver the first fluid to a respective recipient. For example, implementing the adjusted first fluid delivery limit setting associated with the first fluid may include the fluid delivery management resource 640 transmitting the adjusted first fluid delivery limit setting (soft upper limit=300 mcg) to a first fluid delivery device in response to receiving input from the first fluid delivery device requesting to deliver the first fluid as specified by the first fluid identifier to a first recipient.

The adjustment to the soft upper limit from 250 mcg to 300 mcg and/or the alert limit from 5% to 10% reduces the likelihood that the alert indicator 602 will be generated for the subsequent delivery of fluid F1. The fluid delivery management resource 640 receives feedback from fluid delivery pumps delivering the first fluid after the adjustment; the fluid delivery management resource 640 processes the subsequent feedback to determine which portion of the fluid delivery pumps delivered the first fluid at a rate greater than the adjusted limit setting.

In one example, each of the fluid delivery pump programming alerts received from a respective fluid delivery device indicates that a corresponding fluid delivery pump delivered the first fluid F1 at a rate or overall amount greater than the first fluid delivery limit (such as 250 mcg) setting prior to adjustment of the first delivery limit setting (from 250 mcg to 300 mcg). As shown in FIG. 7, the fluid delivery management resource 640 displays the first indication (such as alert indicator 602) of receiving the excessive number of fluid delivery pump programming alerts associated with the first fluid identifier fluid type F1 in response to detecting that the number of fluid delivery pump programming alerts is greater than an alert threshold level of 5%. The adjusted first fluid delivery limit setting (such as soft upper limit from 250 to 300 mcg) transmitted to the multiple fluid delivery pumps is a setting in which each respective fluid delivery pump of the multiple fluid delivery pumps generates a respective fluid delivery pump programming alert in response to detecting a corresponding instance of programming of the respective fluid delivery pump to deliver the first fluid at an amount greater than the adjusted first fluid delivery limit setting of 300 mcg.

Via an input command such as in communications 605 from the user 12 to the fluid delivery management resource 640, the user 12 can be configured to adjust the first alert fluid delivery limit setting (such as changing the soft upper limit from 250 to 300 mcg) associated with the first fluid F1 in response to receiving a command from a user 12 viewing the display screen 130. The adjusted the first fluid delivery limit setting (such as increasing the soft upper limit from 250 to 300 and/or adjusting the alert threshold level percentage from 5% to 10%) reduces subsequent occurrences of the multiple fluid delivery pumps generating pump programming alerts associated with delivery of the first fluid.

As shown in FIG. 7, the fluid delivery management resource 640 displays, on the display screen 130, a second indication (such as alert indicator 604) in response to receiving an excessive number of fluid delivery pump programming alerts associated with the second fluid identifier 610 such as second fluid DEXMEDETOMIDINE. In a similar manner as previously discussed, the fluid delivery management resource 640 can be configured to adjust a second fluid delivery limit setting associated with delivery of the second fluid in response to the excessive number of fluid delivery pump programming alerts associated with the second fluid identifier. Thus, in a similar manner as previously discussed for the second fluid, the fluid delivery management resource 640 can be configured to implement the adjusted second fluid delivery limit setting associated with the second fluid for multiple fluid delivery pumps requesting to deliver the second fluid to a respective recipient subsequent to the adjusted second fluid delivery limit setting.

Figure 12:
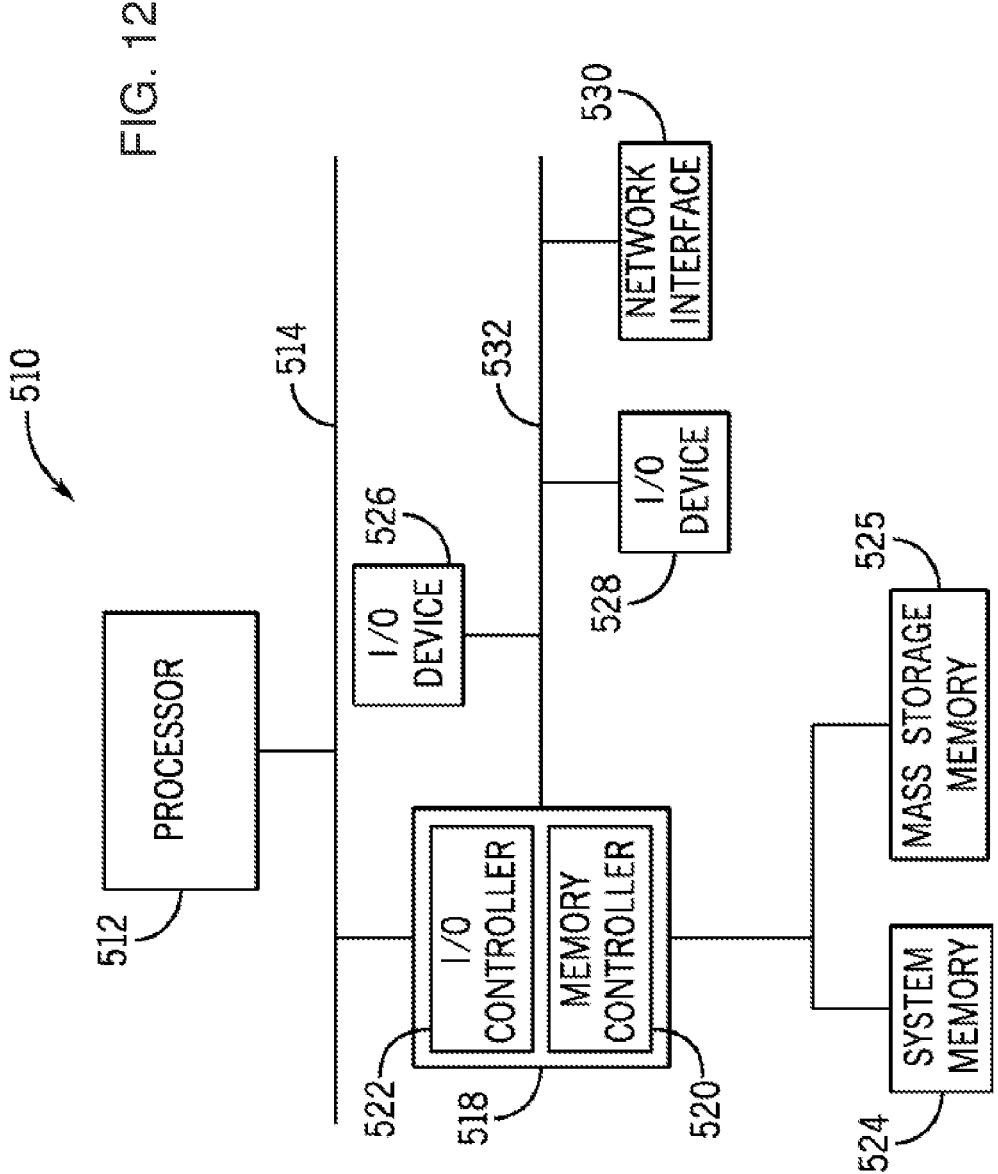
FIG. 12 is a block diagram of a server computer for processing infusion pump data for presentation on a display, according to an illustrative example.

FIG. 12 is a block diagram of a server computer for processing infusion pump data for presentation on a display, according to an illustrative example. In different examples, the systems and methods described herein may be implemented on a single server computer, a plurality of server computers, a server farm, a cloud server environment, or using other computer resources. Server 20 (fluid delivery management resource) and infusion pump 10 may comprise analog and/or digital circuit components forming processing circuits configured to perform the operations described herein. The processing circuits may comprise discrete circuit elements and/or programmed integrated circuits, such as one or more microprocessors, microcontrollers, analog-to-digital converters, application-specific integrated circuits (ASICs), programmable logic, printed circuit boards, and/or other circuit components. Server 20 and infusion pump 10 each may comprise a network interface circuit configured to provide communications over one or more networks with each other and/or with other devices. The network interface circuit may comprise digital and/or analog circuit components configured to perform network communications functions. The networks may comprise one or more of a wide variety of networks, such as wired or wireless networks, wide area-local-area or personal-area networks, proprietary or standards-based networks, etc. The networks may comprise networks such as an Ethernet network, networks operated according to Bluetooth protocols, IEEE 802.11x protocols, cellular (TDMA, CDMA, GSM) networks, or other network protocols. The network interface circuits may be configured for communication of one or more of these networks and may be implemented in one or more different sub-circuits, such as network communication cards, internal or external communication modules, etc.

According to one example, storage of the infusion data records may be implemented on a database coupled to or part of server 20. The database may be a DBMS hosted on a server host platform, such as Microsoft Windows XP, Microsoft Windows Server 2008, etc.

Referring again to FIG. 12, a block diagram of an example processor system 510 is shown that can be used to implement systems, articles of manufacture, and methods described herein. As shown in FIG. 12, the processor system 510 includes a processor 512 that is coupled to an interconnection bus 514. The processor 512 can be any suitable processor, processing unit, or microprocessor, for example. Although not shown in FIG. 12, the system 510 can be a multi-processor system and, thus, can include one or more additional processors that are identical or similar to the processor 512 and that are communicatively coupled to the interconnection bus 514.

The processor 512 of FIG. 12 is coupled to a chipset 518, which includes a memory controller 520 and an input/output ("I/O") controller 522. A chipset may provide I/O and memory management functions as well as a plurality of general purpose and/or special purpose registers, timers, etc. that are accessible or used by one or more processors coupled to the chipset 518. The memory controller 520 performs functions that enable the processor circuit 512 (or processors if there are multiple processors) to access a system memory 524 and a mass storage memory 525.

The system memory 524 (or computer-readable storage hardware) can include any desired type of volatile and/or non-volatile memory such as, for example, static random-access memory (SRAM), dynamic random access memory (DRAM), flash memory, read-only memory (ROM), etc. The mass storage memory 525 (or computer-readable storage hardware) can include any desired type of mass storage device including hard disk drives, optical drives, tape storage devices, etc.

The I/O controller 522 performs functions that enable the processor 512 to communicate with peripheral input/output ("I/O") devices 526 and 528 and a network interface 530 via an I/O bus 532. The I/O devices 526 and 528 can be any desired type of I/O device such as, for example, a keyboard, a video display or monitor, a mouse, etc. The network interface 530 can be, for example, an Ethernet device, an asynchronous transfer mode device, an 802.11 device, a DSL modem, a cable modem, a cellular modem, etc. that enables the processor system 510 to communicate with another processor system.

While the memory controller 520 and the I/O controller 522 are depicted in FIG. 12 as separate blocks within the chipset 518, the functions performed by these blocks can be integrated within a single semiconductor circuit or can be implemented using two or more separate integrated circuits.

Certain examples contemplate methods, systems and computer program products on any machine-readable media to implement functionality described above. Certain examples can be implemented using an existing computer processor, or by a special purpose computer processor incorporated for this or another purpose or by a hardwired and/or firmware system, for example.

Some or all of the system, apparatus, and/or article of manufacture components described above, or parts thereof, can be implemented using instructions, code, and/or other software and/or firmware, etc. stored on a tangible machine accessible, computer-readable storage hardware, or readable medium and executable by, for example, a processor system (e.g., the example processor system 510 of FIG. 12). Tangible computer readable media include a memory, DVD, CD, etc. storing the software and/or firmware, but do not include a propagating signal.

As used herein, the term tangible computer readable medium includes any type of computer readable storage and excludes propagating signals. Additionally or alternatively, the example processes described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

Figure 13:
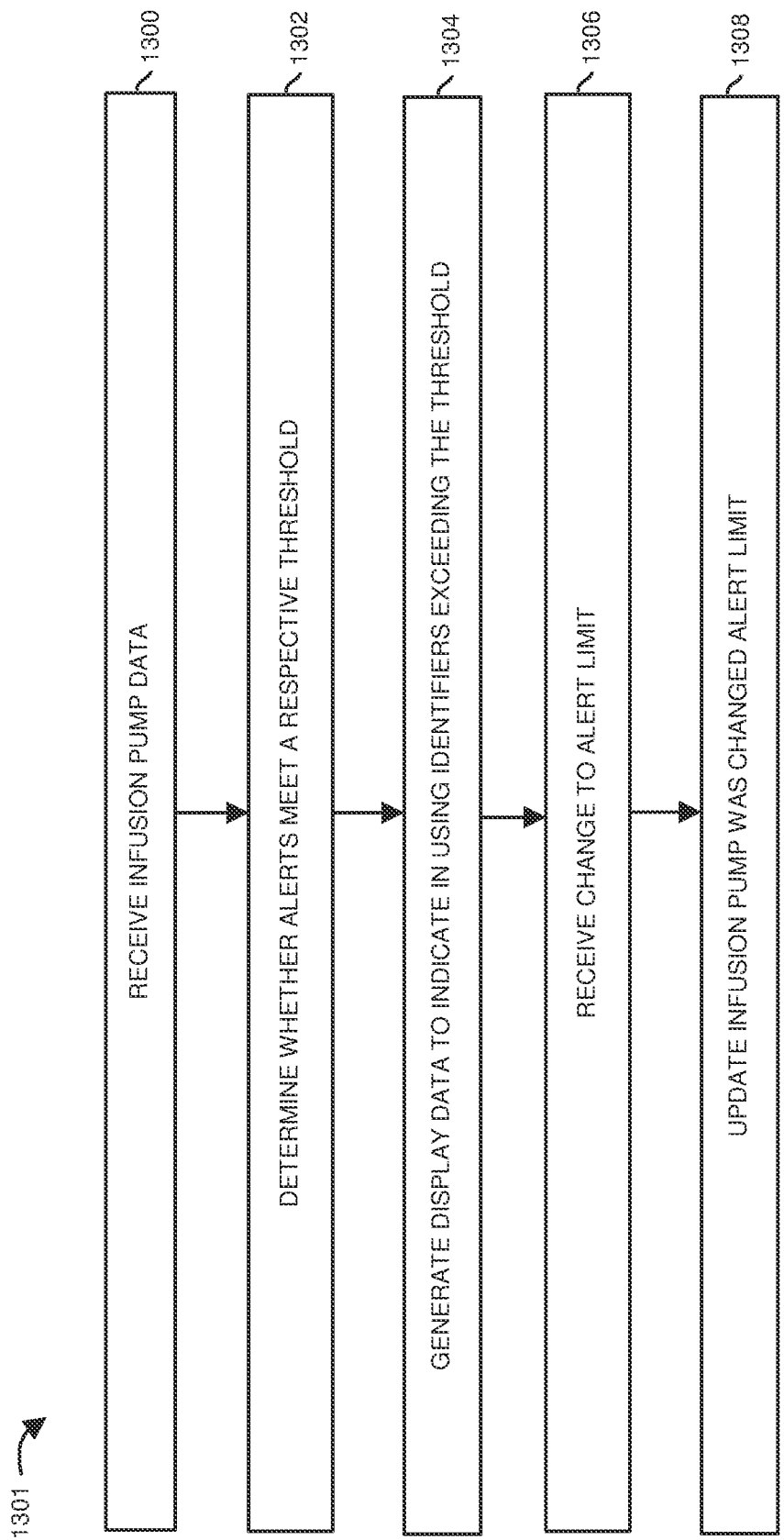
FIG. 13 is a flowchart of a method of improving delivery of an infusate to a person from an infusion pump, according to an illustrative example.

Referring now to FIG. 13, a system and method (such as flowchart 1301) for improving delivery of a fluid to a recipient from an infusion pump will be described.

At processing operation 1300, a server computer is configured to receive infusion pump data from a plurality of infusion pumps over a network interface circuit. The infusion pump data can comprise infusate identifiers (e.g., main label, second label, etc. which may comprise a concentration, generic name, active ingredient, acronym, etc.) and infusion pump programming alert data for each infusate identifier. The alert data may comprise indications that a user of a pump has tried to program a parameter (e.g., flow rate, dose rate, bolus dose, etc.) outside of a limit stored in a drug library for the infusate.

At processing operation 1302, the server computer is configured to determine whether a number of the infusion pump programming alerts meets or exceeds a threshold for each of the infusate identifiers. For example, the threshold may be a number of alerts in a period of time, a number of alerts per infusion, a percentage of infusions having alerts, etc. The server computer may compare infusion pump data to other thresholds as well, such as a minimum number of infusions. The server computer may use one or more of these thresholds to determine an excessive number of alerts for an infusate and to store such an indication in memory. In some examples, the server computer may determine if a number of infusions exceeds a user-defined minimum number of infusions.

At processing operation 1304, the server computer is configured to generate display data for a screen comprising the infusate identifiers and an indication of infusate identifiers having a number of infusion pump programming alerts that meets or exceeds the threshold. The infusate identifiers may be displayed in the form of a list having at least three, at least ten, or more infusate identifiers. To meet or exceed the threshold, the number of alerts need only be at least the amount indicated by the threshold or one greater than the threshold. In some examples, the server computer may be configured to generate the indication that the infusate identifier has a number of infusion pump programming alerts that meets or exceeds the threshold based on whether the number of infusions exceeds a user-defined minimum number of infusions.

At processing operation 1306, the server computer may be configured to receive a change to an alert limit of one of the plurality of infusate identifiers having the indication.

A clinician may review the screen generated in processing operation 1304 and decide that one or more alert limits are to be changed to avoid future alerts. Other actions can be taken, such as providing additional training to clinicians who program the infusion pumps, drugs may be removed from the drug library, etc.

At processing operation 1306, a user changes at least one limit of the drug library based on review of excessive alert indicator(s), and the server computer stores the updated drug library in a memory (or computer-readable storage hardware).

At processing operation 1308, the server computer is configured to transmit the changed alert limit to the infusion pump for infusing the infusate to the person, which may be done as part of a periodic update of drug libraries or shortly after the update is created.

Additional processing operations are contemplated. For example, prior to processing operation 1300 the infusion pump may be configured to receive a programming parameter value, determine whether the programming parameter value is within the changed alert limit, and/or infuse the infusate to the person when the programming parameter value is within the alert limit.

Figure 14:
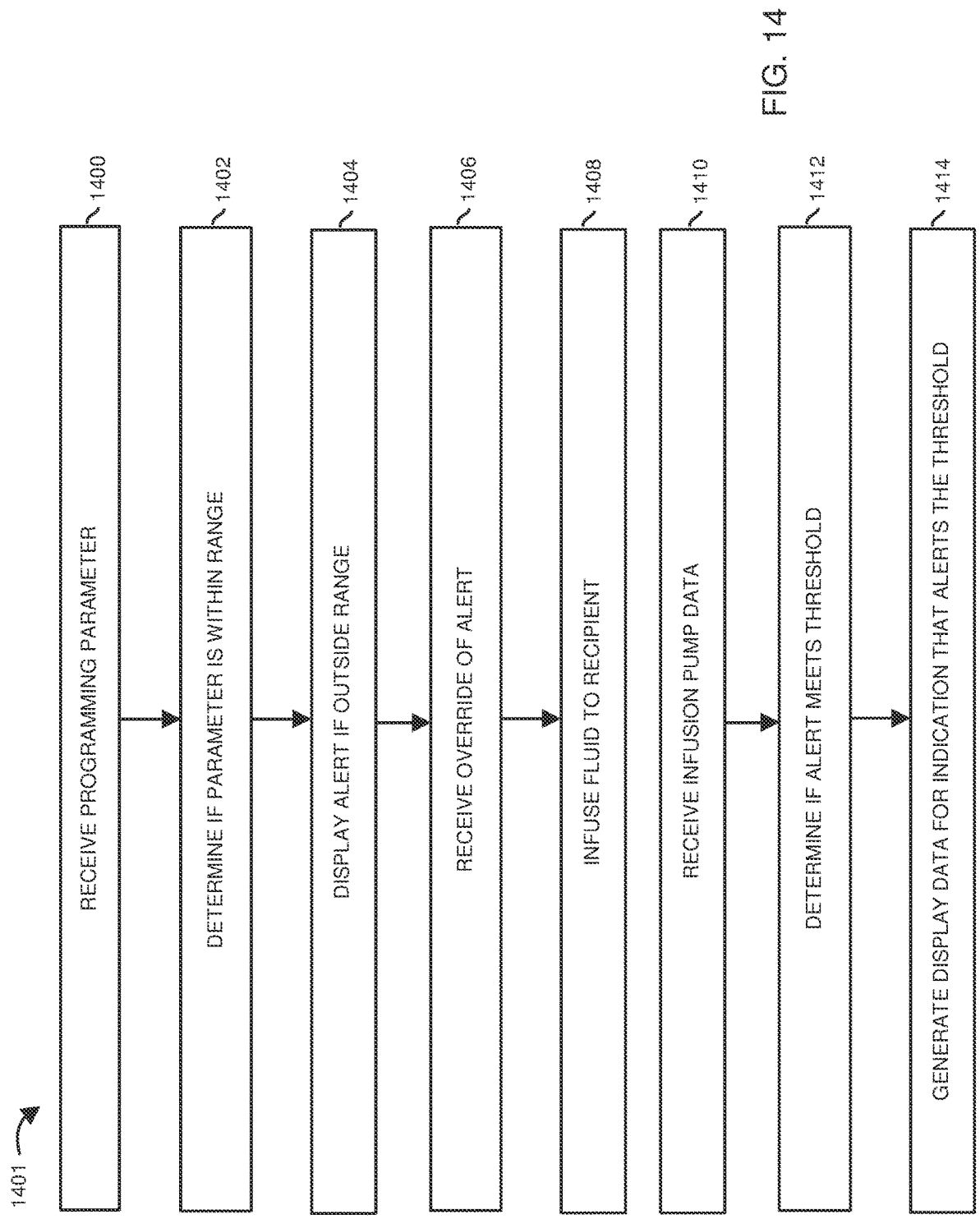
FIG. 14 is a flowchart of a method of programming an infusion pump to deliver an infusate to a person, according to an illustrative example.

Referring now to FIG. 14, a system and method for programming an infusion pump to deliver an infusate to a person will be described.

At processing operation 1400, an infusion pump may be configured to receive a programming parameter at a user interface, such as a volumetric rate, dose rate, bolus dose, etc.

At processing operation 1402, the infusion pump may use a stored drug library to determine whether the programming parameter value is within a range of parameter values, which may be a soft limit range, a hard limit range, etc.

At processing operation 1404, the infusion pump may be configured to display an alert on the user interface if the programming parameter value is outside the range of parameter values. The displayed alert may comprise an icon, a graphic element, a textual element, a picture, a visually distinctive font, a change in background color, etc.

At processing operation 1406, the infusion pump may be configured to receive an override of the alert or a change in the programming parameter value from a user. For example, the user may use a touch screen, soft keys, or other user interface elements to receive a user input indicating the user wishes to proceed in spite of the alert with the programmed parameter value, or that the user wishes to change the parameter value and the new parameter value.

At processing operation 1408, the infusion pump is configured to infuse the infusate to the person using the programming parameter value or changed programming parameter value.

At processing operation 1410, a separate processing circuit (e.g., a remote computer, a server computer, or other computer) may be configured to receive infusion pump data from the infusion pump over a network communication, the infusion pump data comprising an infusate identifier and an indication of the alert. The infusion pump data may be received as part of an infusion data reporting event, which may occur after an infusion, after a number of infusions, on a periodic basis such as hourly, daily, weekly, etc. Infusate identifiers may comprise a name of an infusate or other identifier.

At processing operation 1412, the processing circuit may be configured to determine whether a number of infusion pump programming alerts including the received alert meets or exceeds a threshold for the infusate identifier.

At processing operation 1414, the processing circuit may be configured to generate display data for a screen comprising the infusate identifier and an indication that the number of infusion pump programming alerts meets or exceeds the threshold. As with other examples described herein, the threshold may comprise a percentage of infusions of an infusate named by the infusate identifier having at least one alert.

Other blocks (processing operations) are contemplated. For example, the processing circuit may further be configured to receive a change to an alert limit of the infusate identifier having the indication and store the change in memory as part of an update to a drug library. The processing circuit may further be configured to reprogram the infusion pump with the changed alert limit for the infusate identifier.

Certain examples described herein can omit one or more of the blocks and/or perform the blocks in a different order than the order listed. For example, some blocks need not be performed in certain examples. As a further example, certain blocks can be performed in a different temporal order, including simultaneously, than listed above.

Figure 15:
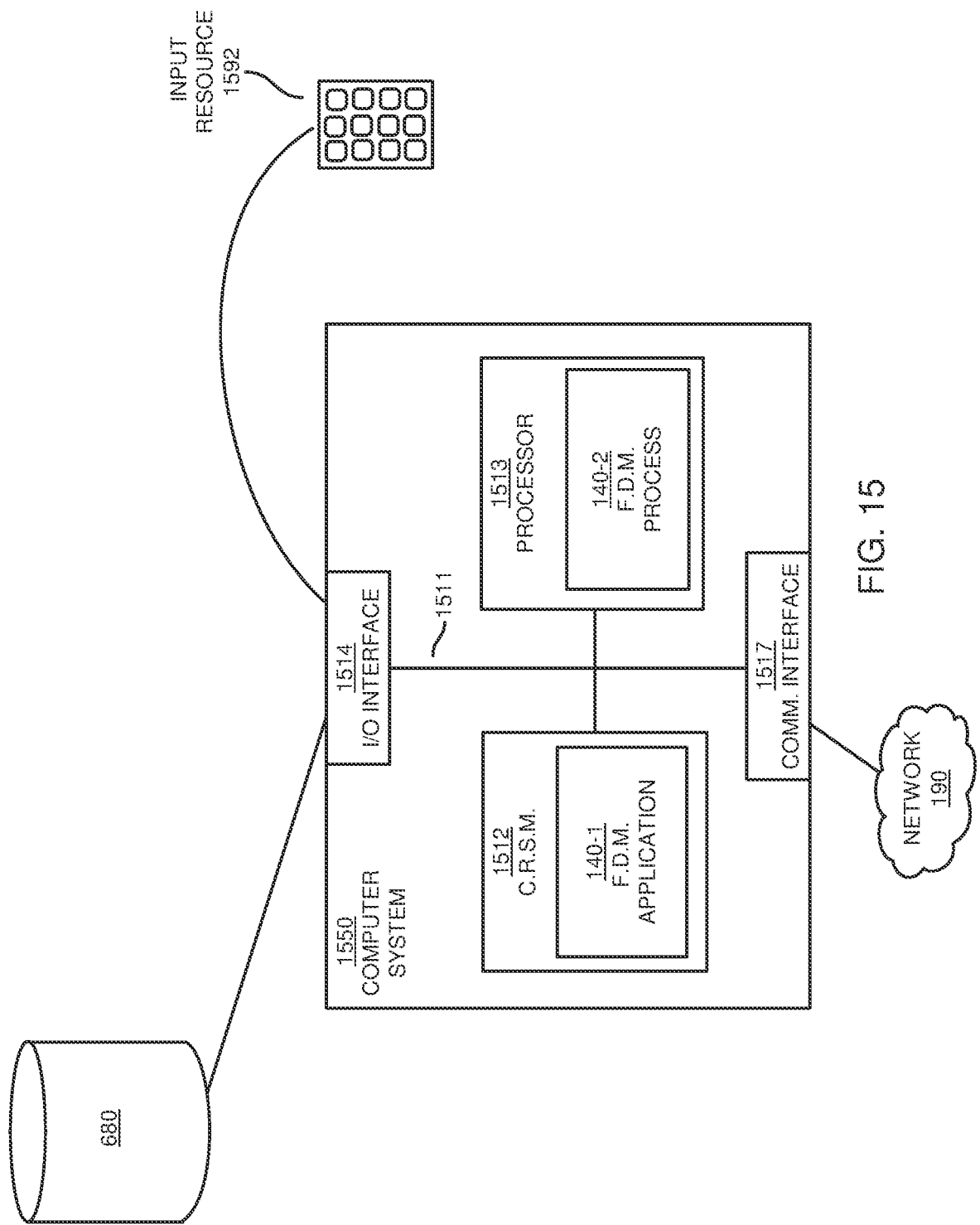
FIG. 15 is an example diagram illustrating example computer architecture operable to execute one or more operations as discussed herein.

FIG. 15 is an example block diagram of a computer system for implementing any of the operations as previously discussed according to embodiments herein.

Any of the resources (such as fluid delivery management resource 640, fluid delivery devices, etc.) as discussed herein can be configured to include computer processor hardware and/or corresponding executable (software) instructions to carry out the different operations as discussed herein.

As shown, computer system 1550 of the present example includes an interconnect 1511 coupling computer readable storage media 1512 such as a non-transitory type of media or any suitable type of hardware storage medium in which digital information can be stored and retrieved, a processor 1513 (computer processor hardware), I/O interface 1514, and a communications interface 1517.

I/O interface(s) 1514 supports connectivity to repository 1580 and input resource 1592.

Computer readable storage medium 1512 can be any hardware storage device such as memory, optical storage, hard drive, floppy disk, etc. In one embodiment, the computer readable storage medium 1512 stores instructions and/or data.

As shown, computer readable storage media 1512 can be encoded with management application 140-1 (e.g., including instructions) to carry out any of the operations as discussed herein.

During operation, processor 1513 accesses computer readable storage media 1512 via the use of interconnect 1511 in order to launch, run, execute, interpret or otherwise perform the instructions in in the management application 140-1 stored on computer readable storage medium 1512. Execution of the management application 140-1 produces management process 140-2 to carry out any of the operations and/or processes as discussed herein.

Those skilled in the art will understand that the computer system 1550 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1550 may reside at any location or can be included in any suitable resource in any network environment to implement functionality as discussed herein.

Functionality supported by the different resources will now be discussed via flowchart 1600 and flowchart 1700 in respective FIGS. 16 and 17. Note that the steps in the flowcharts below can be executed in any suitable order.

Figure 16:
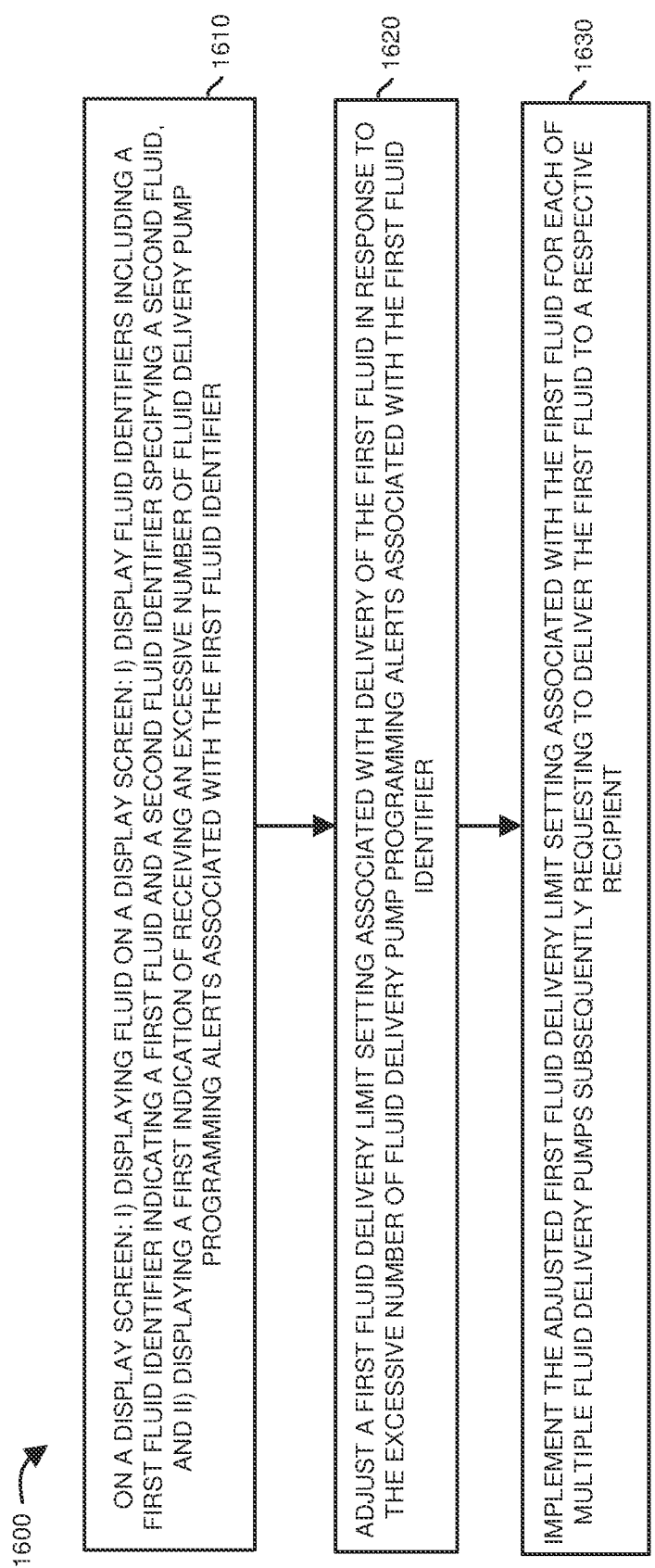
FIGS. 16 and 17 are example diagrams illustrating a method according to embodiments herein.

FIG. 16 is a flowchart 1600 illustrating an example method according to embodiments herein. Note that there will be some overlap with respect to concepts as discussed above.

In processing operation 1610, on a display screen, the fluid delivery management resource 640: i) displays fluid identifiers including a first fluid identifier indicating a first fluid and a second fluid identifier specifying a second fluid, and ii) displays a first indication of receiving an excessive number of fluid delivery pump programming alerts associated with the first fluid identifier.

In processing operation 1620, the fluid delivery management resource 640 adjusts a first fluid delivery limit setting associated with delivery of the first fluid in response to the excessive number of fluid delivery pump programming alerts associated with the first fluid identifier.

In processing operation 1630, the fluid delivery management resource 640 transmits the adjusted first fluid delivery limit setting associated with the first fluid to each of multiple fluid delivery pumps subsequently requesting to deliver the first fluid to a respective recipient.

Figure 17:
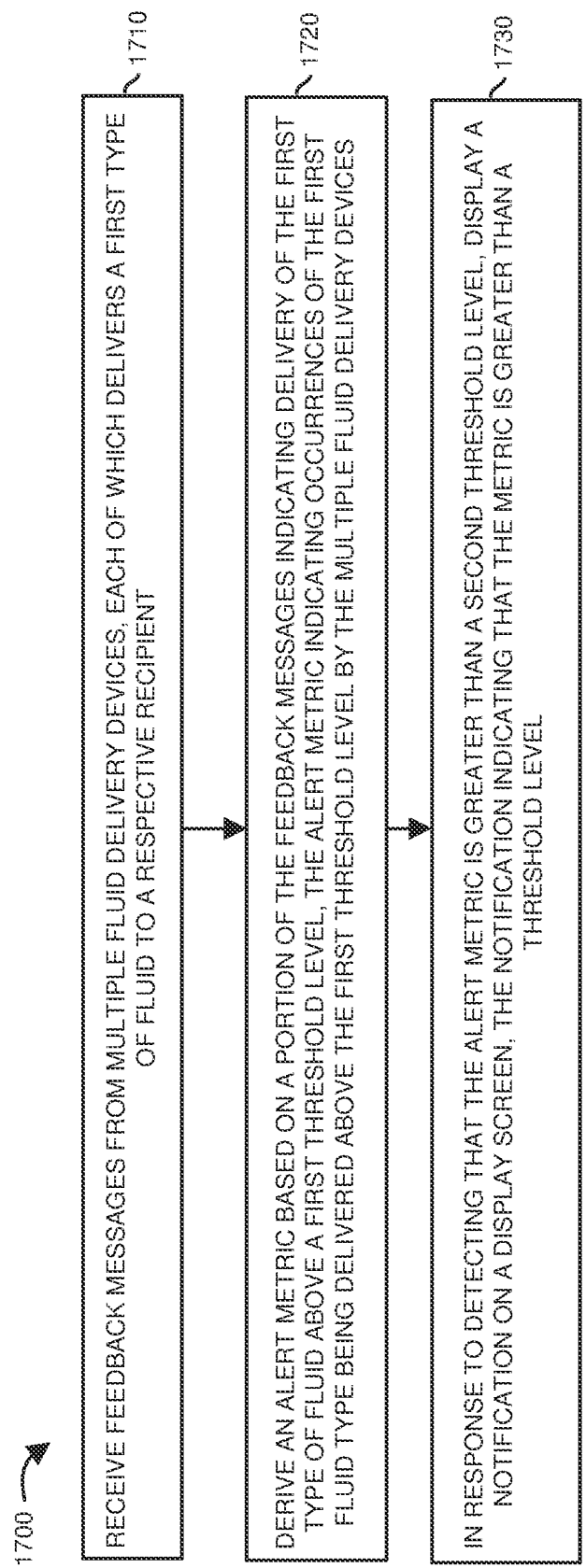

FIG. 17 is a flowchart 1700 illustrating an example method according to embodiments herein.

In processing operation 1710, the fluid delivery management resource 640 receives feedback messages from multiple fluid delivery devices, each of which delivers a first type of fluid to a respective recipient.

In processing operation 1720, the fluid delivery management resource 640 derives an alert metric based on a portion of the feedback messages indicating delivery of the first type of fluid above a first threshold level, the alert metric indicating occurrences of the first fluid type being delivered above the first threshold level by the multiple fluid delivery devices.

In processing operation 1730, in response to detecting that the alert metric being greater than a second threshold level, the fluid delivery management resource displays a notification on a display screen. The notification indicates that the generated alert metric (such as based on a count value indicating how many of the fluid delivery devices delivers the fluid at a higher amount than a threshold limit) is greater than a threshold level.

While the examples have been described with reference to certain details, it will be understood by those skilled in the art that various changes can be made and equivalents can be substituted without departing from the scope described herein. In addition, many modifications can be made to adapt a particular situation or material to the teachings without departing from its scope. Therefore, it is intended that the teachings herein not be limited to the particular examples disclosed, but rather include additional examples falling within the scope of the appended claims.

We claim:

1. A method comprising:
   on a display screen: i) displaying fluid identifiers including a first fluid identifier indicating a first fluid and a second fluid identifier specifying a second fluid, and ii) displaying a first indication of receiving a number of fluid delivery pump programming alerts associated with the first fluid identifier that exceeds a threshold;
   adjusting a first fluid delivery limit setting associated with delivery of the first fluid in response to the number of fluid delivery pump programming alerts associated with the first fluid identifier exceeding the threshold; and
   implementing the adjusted first fluid delivery limit setting associated with the first fluid for each of multiple fluid delivery pumps subsequently requesting to deliver the first fluid to a respective recipient.

2. The method as in claim 1, wherein each of the fluid delivery pump programming alerts indicates that a corresponding fluid delivery pump delivered the first fluid at a rate greater than the first fluid delivery limit setting prior to adjustment of the first delivery limit setting.

3. The method as in claim 2 further comprising:
   displaying the first indication of receiving the number of fluid delivery pump programming alerts associated with the first fluid identifier exceeding the threshold in response to detecting that the number of fluid delivery pump programming alerts is greater than a percentage threshold level.

4. The method as in claim 3, wherein the adjusted first fluid delivery limit setting transmitted to the multiple fluid delivery pumps is a setting in which each respective fluid delivery pump of the multiple fluid delivery pumps generates a respective fluid delivery pump programming alert in response to detecting a corresponding instance of programming of the respective fluid delivery pump to deliver the first fluid at an amount greater than the adjusted first fluid delivery limit setting.

5. The method as in claim 1 further comprising:
   adjusting the first fluid delivery limit setting associated with the first fluid in response to receiving a command from a user viewing the display screen.

6. The method as in claim 1, wherein adjusting the first fluid delivery limit setting includes increasing the magnitude of the first fluid delivery limit setting, the increased magnitude of the first fluid delivery limit setting operative to reduce subsequent occurrences of the multiple fluid delivery pumps generating pump programming alerts associated with delivery of the first fluid.

7. The method as in claim 1 further comprising:
   displaying the first indication in response to detecting that the number of fluid delivery pump programming alerts associated with the first fluid identifier exceeding the threshold is greater than a first alert threshold level associated with the first fluid.

8. The method as in claim 1, wherein the first fluid delivery limit setting is a percentage value specifying a percent threshold level.

9. The method as in claim 1, wherein implementing the adjusted first fluid delivery limit setting associated with the first fluid includes:
   transmitting the adjusted first fluid delivery limit setting to a first fluid delivery device in response to receiving input from the first fluid delivery device requesting to deliver the first fluid as specified by the first fluid identifier to a first recipient.

10. The method as in claim 1 further comprising:
    receiving feedback from fluid delivery pumps delivering the first fluid, the feedback processed by a fluid delivery management resource to determine which portion of the fluid delivery pumps delivered the first fluid at a rate greater than the adjusted limit setting.

11. The method as in claim 1 further comprising:
    on the display screen, displaying a second indication in response to receiving a number of fluid delivery pump programming alerts associated with the second fluid identifier that exceeds the threshold.

12. The method as in claim 11 further comprising:
    adjusting a second fluid delivery limit setting associated with delivery of the second fluid in response to the number of fluid delivery pump programming alerts associated with the second fluid identifier exceeding the threshold; and
    implementing the adjusted second fluid delivery limit setting associated with the second fluid for multiple fluid delivery pumps requesting to deliver the second fluid to a respective recipient subsequent to the adjusted second fluid delivery limit setting.

13. A system comprising:
    fluid delivery management hardware operative to:
    on a display screen: i) display fluid identifiers including a first fluid identifier indicating a first fluid and a second fluid identifier specifying a second fluid, and ii) display a first indication of receiving a number of fluid delivery pump programming alerts associated with the first fluid identifier that exceeds a threshold;
adjust a first fluid delivery limit associated with delivery of the first fluid in response to the number of fluid delivery pump programming alerts associated with the first fluid identifier exceeding the threshold; and
implement the adjusted first fluid delivery limit associated with the first fluid for each of multiple fluid delivery pumps requesting to deliver the first fluid to a respective recipient.

14. The system as in claim 13, wherein each of the fluid delivery pump programming alerts indicates that a corresponding fluid delivery pump delivered the first fluid at a rate greater than the first fluid delivery limit setting prior to adjustment of the first delivery limit setting.

15. The system as in claim 14, wherein the fluid delivery management hardware is further operative to:
displaying the first indication of receiving the number of fluid delivery pump programming alerts associated with the first fluid identifier exceeding the threshold in response to detecting that the number of fluid delivery pump programming alerts is greater than a percentage threshold level.

16. The system as in claim 15, wherein the adjusted first fluid delivery limit setting transmitted to the multiple fluid delivery pumps is a setting in which each respective fluid delivery pump of the multiple fluid delivery pumps generates a respective fluid delivery pump programming alert in response to detecting a corresponding instance of programming of the respective fluid delivery pump to deliver the first fluid at an amount greater than the adjusted first fluid delivery limit setting.

17. The system as in claim 13, wherein the fluid delivery management hardware is further operative to:
adjust the first fluid delivery limit setting associated with the first fluid in response to receiving a command from a user viewing the display screen.

18. The system as in claim 13, wherein the fluid delivery management hardware is further operative to:
increase the magnitude of the first fluid delivery limit setting, the increased magnitude of the first fluid delivery limit setting operative to reduce subsequent occurrences of the multiple fluid delivery pumps generating pump programming alerts associated with delivery of the first fluid.

19. The system as in claim 13, wherein the fluid delivery management hardware is further operative to:
display the first indication in response to detecting that the number of fluid delivery pump programming alerts associated with the first fluid identifier exceeding the threshold is greater than a first alert threshold level associated with the first fluid.

20. The system as in claim 13, wherein the first fluid delivery limit setting is a percentage value specifying a percent threshold level.

21. The system as in claim 13, wherein the fluid delivery management hardware is further operative to:
transmit the adjusted first fluid delivery limit setting to a first fluid delivery device in response to receiving input from the first fluid delivery device requesting to deliver the first fluid as specified by the first fluid identifier to a first recipient.

* * * * *